(12) United States Patent
No et al.

(10) Patent No.: US 12,451,082 B2
(45) Date of Patent: Oct. 21, 2025

(54) SENSOR AND DISPLAY DEVICE INCLUDING THE SAME

(71) Applicant: Samsung Display Co., Ltd., Yongin-si (KR)

(72) Inventors: Sang Yong No, Yongin-si (KR); Sunkwun Son, Yongin-si (KR); Dong Hee Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/604,293

(22) Filed: Mar. 13, 2024

(65) Prior Publication Data

US 2024/0331642 A1 Oct. 3, 2024

(30) Foreign Application Priority Data

Mar. 30, 2023 (KR) .................. 10-2023-0042196

(51) Int. Cl.
*G09G 3/3266* (2016.01)
*G06F 3/042* (2006.01)
*G09G 3/32* (2016.01)
*H10K 59/40* (2023.01)

(52) U.S. Cl.
CPC ......... *G09G 3/3266* (2013.01); *G06F 3/0421* (2013.01); *G09G 3/32* (2013.01); *H10K 59/40* (2023.02); *G09G 2310/0267* (2013.01); *G09G 2310/08* (2013.01)

(58) Field of Classification Search
CPC ............... G09G 3/3266; G09G 3/32; G09G 2310/0267; G09G 2310/08; G09G 3/3233; G06F 3/0421; G06F 3/0418; G06F 3/0445; G06F 3/04164; G06F 3/047; H10K 59/40; G06V 40/1306

See application file for complete search history.

(56) References Cited

U.S. PATENT DOCUMENTS

| | | | |
|---|---|---|---|
| 6,960,788 B2 | 11/2005 | Joo et al. | |
| 9,576,179 B2 | 2/2017 | Bae et al. | |
| 11,521,420 B2 * | 12/2022 | Beon | H10K 59/65 |
| 11,740,734 B2 * | 8/2023 | Tada | G06V 40/1365 |
| | | | 382/124 |
| 2013/0093729 A1 * | 4/2013 | Cheng | G06F 3/0412 |
| | | | 250/206 |
| 2016/0253011 A1 * | 9/2016 | Yang | H10K 59/1216 |
| | | | 345/173 |

(Continued)

FOREIGN PATENT DOCUMENTS

| | | |
|---|---|---|
| KR | 10-0964586 B1 | 6/2010 |
| KR | 10-2257287 B1 | 5/2021 |

*Primary Examiner* — Grant Sitta
(74) *Attorney, Agent, or Firm* — Womble Bond Dickinson (US) LLP

(57) ABSTRACT

Disclosed is a sensor of a display device including a light-sensing element connected to a first sensing node, a first transistor connected between a reset voltage line and the first sensing node, a second transistor connected between a sensor-driving voltage line and a second sensing node, and including a gate electrode connected to the first sensing node, a third transistor connected between the second sensing node and a readout line, and including a gate electrode connected to a scan line, and a compensation capacitor connected between the gate electrode of the second transistor and the scan line.

20 Claims, 10 Drawing Sheets

(56) References Cited

U.S. PATENT DOCUMENTS

| | | | |
|---|---|---|---|
| 2016/0266702 A1* | 9/2016 | Yang | G09G 3/2092 |
| 2017/0162121 A1* | 6/2017 | Yang | G06F 3/007 |
| 2018/0234655 A1* | 8/2018 | Yang | H10F 19/50 |
| 2019/0253659 A1* | 8/2019 | Kobayashi | H04N 25/79 |
| 2019/0279566 A1* | 9/2019 | Wang | G09G 3/3233 |
| 2019/0281242 A1* | 9/2019 | Cheng | H04N 25/78 |
| 2020/0043417 A1* | 2/2020 | Yang | G06V 40/1306 |
| 2020/0176551 A1* | 6/2020 | Park | H10K 59/1216 |
| 2021/0165524 A1* | 6/2021 | Liu | B06B 1/0688 |
| 2021/0200366 A1* | 7/2021 | Bok | G06V 10/17 |
| 2021/0313384 A1* | 10/2021 | Tada | H10F 39/198 |
| 2021/0326558 A1* | 10/2021 | Lee | G06V 40/1318 |
| 2021/0406508 A1* | 12/2021 | Shih | G06V 40/1318 |
| 2022/0013061 A1* | 1/2022 | Hsieh | G09G 3/32 |
| 2022/0052101 A1* | 2/2022 | Yao | G06V 40/1318 |
| 2022/0147730 A1* | 5/2022 | Kim | G06V 40/1365 |
| 2022/0171494 A1* | 6/2022 | Shih | G06F 3/04883 |
| 2022/0197466 A1* | 6/2022 | Chang | G06F 3/0446 |
| 2023/0217131 A1* | 7/2023 | Hashimoto | H04N 25/69 |
| | | | 348/207.99 |
| 2024/0312407 A1* | 9/2024 | Park | G09G 3/3233 |
| 2024/0321178 A1* | 9/2024 | Qiu | G09G 3/20 |

* cited by examiner

SENSOR AND DISPLAY DEVICE INCLUDING THE SAME

CROSS-REFERENCE TO RELATED APPLICATION

The present application claims priority to, and the benefit of, Korean Patent Application No. 10-2023-0042196 filed on Mar. 30, 2023, in the Korean Intellectual Property Office, the content of which in its entirety is herein incorporated by reference.

BACKGROUND

1. Field

Embodiments of the present disclosure described herein relate to a display device capable of recognizing biometric information and recognizing a touch.

2. Description of Related Art

Each of multimedia electronic devices, such as a TV, a mobile phone, a tablet personal computer (PC), a navigation system, a game console, and the like, includes a display device that displays an image. In addition to a general input method, such as a button, a keyboard, a mouse, or the like, an electronic device may include a display device capable of providing a touch-based input method that allows a user to enter information or commands easily and intuitively.

Nowadays, a method using a fingerprint, which is one of biometric information, has been proposed as a user authentication means for online banking, product purchase, security, or the like.

SUMMARY

Embodiments of the present disclosure provide a display device with improved performance of biometric information recognition and touch recognition.

According to one or more embodiments, a sensor includes a light-sensing element connected to a first sensing node, a first transistor connected between a reset voltage line and the first sensing node, a second transistor connected between a sensor-driving voltage line and a second sensing node, and including a gate electrode connected to the first sensing node, a third transistor connected between the second sensing node and a readout line, and including a gate electrode connected to a scan line, and a compensation capacitor connected between the gate electrode of the second transistor and the scan line.

The sensor may further include an upper electrode above the gate electrode of the second transistor, and electrically connected to the scan line through a contact hole, wherein the compensation capacitor includes the gate electrode of the second transistor and the upper electrode.

A part of the upper electrode may overlap the gate electrode of the second transistor, and another part of the upper electrode may overlap the scan line.

The scan line may include a same material as, and may be at a same layer as, the gate electrode of the second transistor.

The first transistor may include a first type, wherein the second transistor and the third transistor include a second type that is different from the first type.

According to one or more embodiments, a display device includes a pixel including a pixel including a light-emitting element, a sensor including a light-sensing element, and a sensor-driving circuit connected to the light-sensing element through a first sensing node, and a readout circuit configured to receive a sensing signal from the sensor, wherein the sensor-driving circuit of the sensor includes a first transistor connected between a reset voltage line and the first sensing node, a second transistor connected between a sensor-driving voltage line and a second sensing node, and including a gate electrode connected to the first sensing node, a third transistor connected between the second sensing node and a readout line, and including a gate electrode connected to a scan line, and a compensation capacitor connected between the gate electrode of the second transistor and the scan line.

The display device may further include an upper electrode above the gate electrode of the second transistor, and electrically connected to the scan line through a contact hole, wherein the compensation capacitor includes the gate electrode of the second transistor and the upper electrode.

A part of the upper electrode may overlap the gate electrode of the second transistor, and another part of the upper electrode may overlap the scan line.

The scan line may include a same material as, and may be at a same layer as, the gate electrode of the second transistor.

The first transistor may include a first type, wherein the second transistor and the third transistor include a second type that is different from the first type.

The display device may further include a first pixel transistor including a first electrode, a second electrode connected to the light-emitting element, and a gate electrode, a second pixel transistor connected between a data line and the first electrode of the first pixel transistor, and including a gate electrode connected to the scan line, and a third pixel transistor connected between the second electrode of the first pixel transistor and the gate electrode of the first pixel transistor, and including a gate electrode connected to a compensation scan line.

The first pixel transistor and the second pixel transistor may include the second type, wherein the third pixel transistor includes the first type.

The display device may further include a scan-and-sensor driver configured to provide a scan signal to the scan line.

According to one or more embodiments, a display device includes a base layer, a circuit layer above the base layer, and an element layer above the circuit layer, and including a light-emitting element and a light-sensing element, wherein the circuit layer includes a first transistor connected to the light-sensing element through a first sensing node, a second transistor connected between a sensor-driving voltage line and a second sensing node, and including a gate electrode connected to the first sensing node, a third transistor connected between the second sensing node and a readout line, and including a gate electrode connected to a scan line, and an upper electrode above the gate electrode of the second transistor and electrically connected to the scan line through a contact hole, and wherein a compensation capacitor includes the gate electrode of the second transistor and the upper electrode.

A part of the upper electrode may overlap the gate electrode, and another part of the upper electrode may overlap the scan line.

The scan line may include a same material as, and may be at a same layer as, the gate electrode of the second transistor.

The first transistor may include a first type, wherein the second transistor and the third transistor include a second type that is different from the first type.

The circuit layer may further include a first pixel transistor including a first electrode, a second electrode connected to the light-emitting element, and a gate electrode, a second pixel transistor connected between a data line and the first electrode of the first pixel transistor, and including a gate electrode connected to the scan line, and a third pixel transistor connected between the second electrode of the first pixel transistor and the gate electrode of the first pixel transistor, and including a gate electrode connected to a compensation scan line.

According to one or more embodiments, a sensor includes a light-sensing element connected to a first sensing node, a first transistor connected between a reset voltage line and the first sensing node, a second transistor connected between a sensor-driving voltage line and a second sensing node, and including a gate electrode connected to the first sensing node, and a body electrode electrically connected to a scan line, and a third transistor connected between the second sensing node and a readout line, and including a gate electrode connected to the scan line.

The first transistor may include a first type, wherein the second transistor and the third transistor include a second type that is different from the first type.

BRIEF DESCRIPTION OF THE FIGURES

The above and other aspects of the present disclosure will become apparent by describing in detail embodiments thereof with reference to the accompanying drawings.

DETAILED DESCRIPTION

Figure 1:
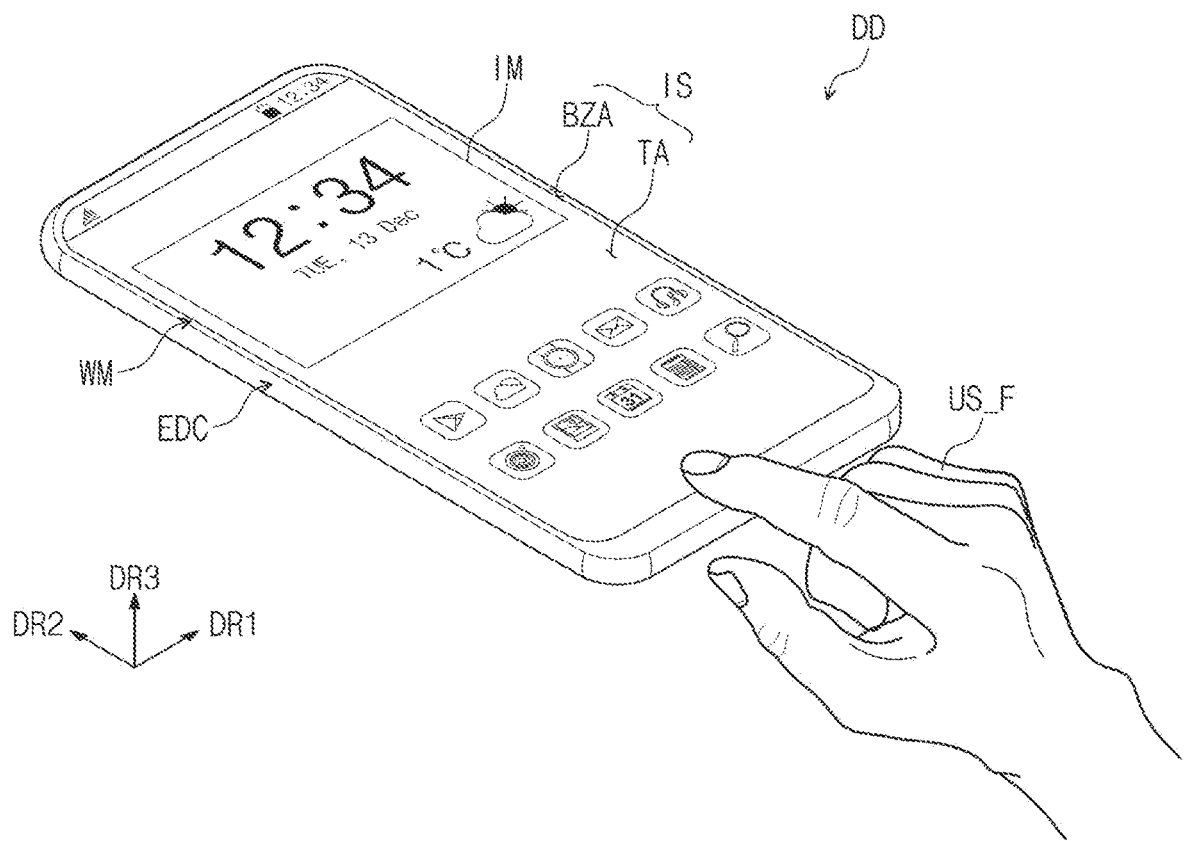
FIG. 1 is a perspective view of a display device, according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The present disclosure covers all modifications, equivalents, and replacements within the idea and technical scope of the present disclosure. Further, each of the features of the various embodiments of the present disclosure may be combined or combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above"

the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
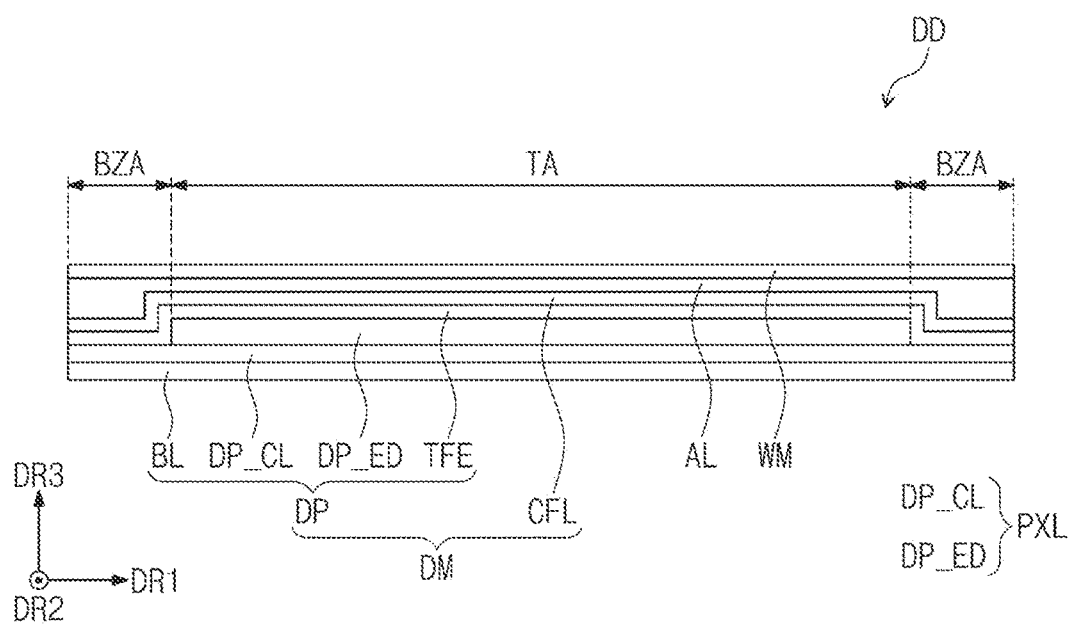
FIG. 2 is a cross-sectional view of a display device, according to one or more embodiments of the present disclosure.

FIG. 1 is a perspective view of a display device DD, according to one or more embodiments of the present disclosure. FIG. 2 is a cross-sectional view of the display device DD, according to one or more embodiments of the present disclosure.

Referring to FIGS. 1 and 2, the display device DD may be a device activated depending on an electrical signal. For example, the display device DD may be a mobile phone, a tablet PC, a car navigation system, a game console, or a wearable device, but is not limited thereto. FIG. 1 illustrates that the display device DD is a mobile phone.

In addition, although the rigid-type display device DD in a form of a bar is illustrated in FIG. 1, it is not particularly limited thereto. For example, the display device DD may be a foldable, rollable, or slidable display device DD.

A top surface of the display device DD may be defined as a display surface IS, and may have a plane defined by a first direction DR1 and a second direction DR2. Images IM generated by the display device DD may be provided to a user through the display surface IS. Hereinafter, a normal direction, which is substantially perpendicular to a plane defined by the first direction DR1 and the second direction DR2, is defined as a third direction DR3. In the specification, the meaning of "when viewed from above a plane" may mean "when viewed in the third direction DR3". That is, the plane may be parallel to a plane defined by the first and second directions DR1 and DR2.

The display surface IS may be divided into a transmission area TA and a bezel area BZA. The transmission area TA may be an area in which the images IM are displayed. The user visually perceives the images IM through the transmission area TA. In one or more embodiments, the transmission area TA is illustrated in the shape of a quadrangle whose corners are rounded. However, this is illustrated as an example. The transmission area TA may have various shapes, not limited to one or more embodiments.

The bezel area BZA is adjacent to the transmission area TA. The bezel area BZA may have a corresponding color (e.g., a predetermined color). The bezel area BZA may surround the transmission area TA. Accordingly, the shape of the transmission area TA may be substantially defined by the bezel area BZA. However, this is illustrated as an example. For example, the bezel area BZA may be located adjacent to only one side of the transmission area TA, or may be omitted.

The display device DD may sense an external input applied from the outside. The external input may include various types of inputs that are provided from the outside of the display device DD. For example, as well as a contact by a part of a body, such as the user's finger US_F, the external input may be applied when the user's hand US_F approaches the display device DD (e.g., hovering) or is adjacent to the display device DD within a distance (e.g., a predetermined distance). In addition, the external input may have various types, such as force, pressure, temperature, light, and the like. The external input may be provided by a separate device, for example, an active pen or a digitizer pen. Moreover, the display device DD may detect the user's biometric information applied from the outside.

The appearance of the display device DD may be composed of a window WM and housing EDC. For example, the window WM and the housing EDC may be coupled to each other, and other components of the display device DD, for example, the display module DM may be accommodated therein.

A front surface of the window WM defines the display surface IS of the display device DD. The window WM may include an optically transparent insulating material. For example, the window WM may include glass or plastic. The window WM may include a multi-layer structure or a single layer structure. For example, the window WM may include a plurality of plastic films bonded to each other by an adhesive or may have a glass substrate and a plastic film bonded to each other by an adhesive.

The housing EDC may include a material having relatively high rigidity. For example, the housing EDC may include glass, plastic, or metal or may include a plurality of frames and/or plates that are composed of a combination thereof. The housing EDC may stably protect configurations of the display device DD accommodated in the inner space from an external impact. In one or more embodiments, a battery module for supplying power required for overall operations of the display device DD may be interposed between the display module DM and the housing EDC.

The display module DM may include a display panel DP and an anti-reflection layer CFL.

The display panel DP may be a configuration that substantially generates an image. The display panel DP may be a light-emitting display panel. For example, the display panel DP may be an organic light-emitting display panel, an inorganic light-emitting display panel, an organic-inorganic light-emitting display panel, a quantum dot display panel, a micro-LED display panel, or a nano-LED display panel. Hereinafter, it is described that the display panel DP is an organic light-emitting display panel.

The display panel DP includes a base layer BL, a pixel layer PXL, and an encapsulation layer TFE. The display panel DP according to one or more embodiments of the present disclosure may be a flexible display panel. However, the present disclosure is not limited thereto. For example, the display panel DP may be a foldable display panel, which is folded with respect to a folding axis, or a rigid display panel.

The base layer BL may include a synthetic resin layer. The synthetic resin layer may be a polyimide-based resin layer, and the material thereof is not particularly limited thereto. Besides, the base layer BL may include a glass substrate, a metal substrate, an organic/inorganic composite substrate, or the like.

The pixel layer PXL is located on the base layer BL. The pixel layer PXL may include a circuit layer DP_CL and an element layer DP_ED. The circuit layer DP_CL is interposed between the base layer BL and the element layer DP_ED.

The circuit layer DP_CL includes at least one insulating layer and a circuit element. Hereinafter, the insulating layer included in the circuit layer DP_CL is referred to as an "intermediate insulating layer". The intermediate insulating layer includes at least one intermediate inorganic film and at least one intermediate organic film. The circuit element may include a pixel circuit, which is included in each of a plurality of pixels for displaying an image, and a sensor-driving circuit, which is included in each of a plurality of sensors for recognizing external information. The circuit layer DP_CL may further include signal lines connected to the pixel circuit and/or the sensor-driving circuit.

As an example of the present disclosure, each of the plurality of sensors may be a fingerprint recognition sensor, a proximity sensor, an iris recognition sensor, or the like. Furthermore, each of the plurality of sensors may be an optical sensor that recognizes the biometric information in an optical scheme. According to one or more embodiments of the present disclosure, an external input (e.g., a user's touch) as well as biometric information, such as a fingerprint, may be sensed by using the plurality of sensors. Accordingly, the display device DD may not include a separate input sensing layer for sensing an external input. In this case, the thickness of the display device DD may be further reduced. As a result, flexibility may be improved, and thus the display device DD may be implemented in various types. For example, the display device DD may be implemented as a foldable, rollable, or slidable display device described above.

The element layer DP_ED may include a light-emitting element included in each of the pixels, and a light-sensing element included in each of the sensors. As an example of the present disclosure, the light-sensing element may be a photodiode. The light-sensing element may be a sensor that detects or responds to light reflected by a user's fingerprint. The circuit layer DP_CL and the element layer DP_ED will be described in detail later with reference to FIG. 9.

The encapsulation layer TFE encapsulates the element layer DP_ED. The encapsulation layer TFE may include at least one organic film and at least one inorganic film. The inorganic film may include inorganic materials, and may protect the element layer DP_ED from moisture/oxygen. The inorganic film may include a silicon nitride layer, a silicon oxynitride layer, a silicon oxide layer, a titanium oxide layer, an aluminum oxide layer, or the like, but not limited particularly thereto. The organic film may include organic materials, and may protect the element layer DP_ED from foreign objects, such as dust particles.

The anti-reflection layer CFL may be located on the display panel DP. The anti-reflection layer CFL may reduce the reflectance of external light incident from the outside of the display device DD. The anti-reflection layer CFL may be formed on the input display panel DP through sequential processes, but the present disclosure is not limited thereto. For example, the anti-reflection layer CFL may include color filters, a black matrix, and a planarization layer. The color filters may have a given arrangement. For example, the color filters may be arranged in consideration of emission colors of pixels included in the display panel DP. In one or more embodiments, the anti-reflection layer CFL may include a black matrix and a reflection adjustment layer. The reflection adjustment layer may selectively absorb light in a partial band among light reflected from inside the display panel DP and/or an electronic device or incident light from the outside of the display panel DP and/or the electronic device. In one or more embodiments, the anti-reflection layer CFL may be a polarizing film.

The display device DD according to one or more embodiments of the present disclosure may further include an adhesive layer AL. The window WM may be attached to the anti-reflection layer CFL by the adhesive layer AL. The adhesive layer AL may include an optical clear adhesive, an optically clear adhesive resin, or a pressure sensitive adhesive (PSA).

Figure 3:
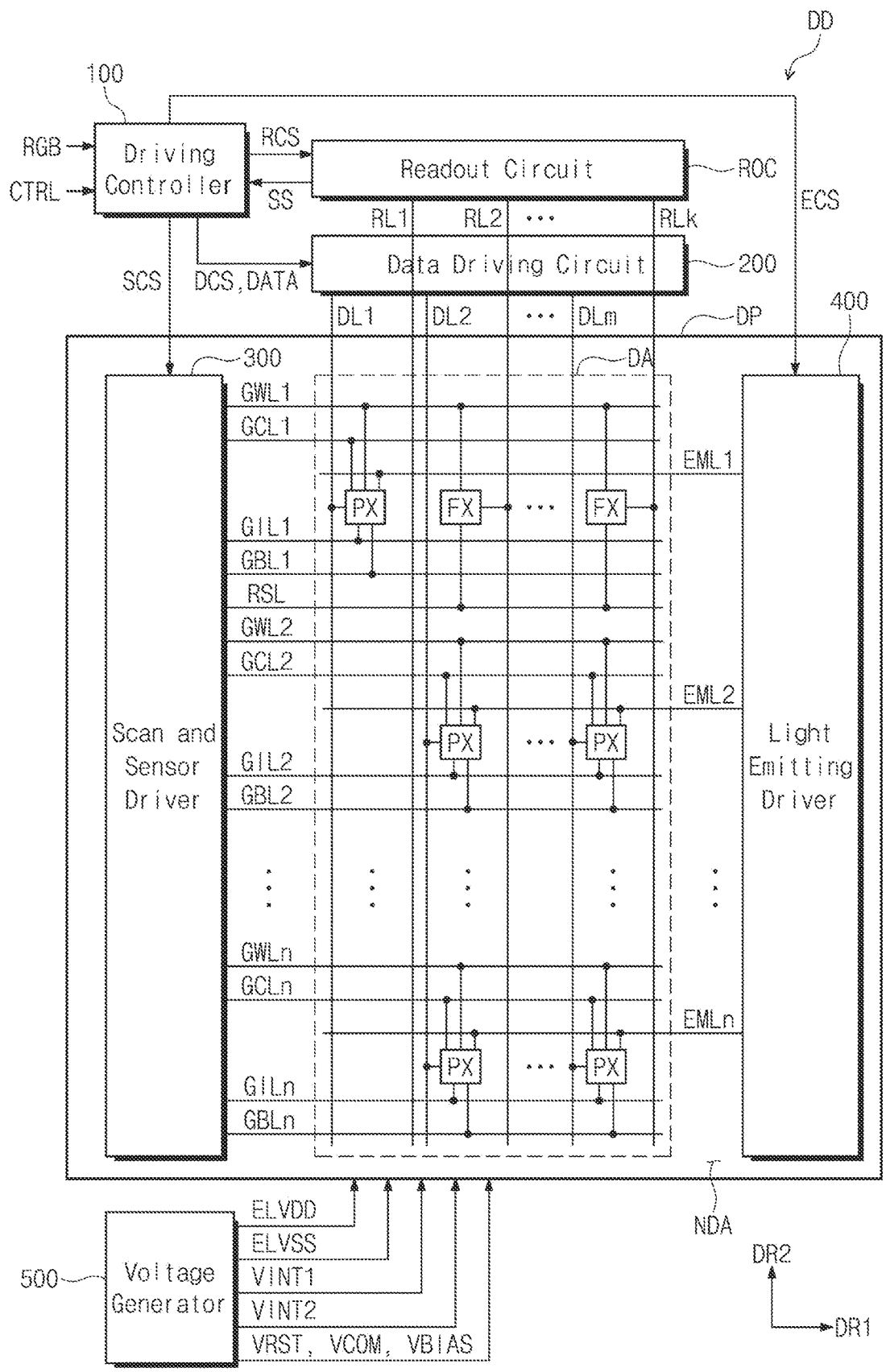
FIG. 3 is a block diagram of a display device, according to one or more embodiments of the present disclosure.

FIG. 3 is a block diagram of a display device, according to one or more embodiments of the present disclosure.

Referring to FIG. 3, the display device DD includes the display panel DP, a driving controller 100, a data-driving circuit 200, a scan-and-sensor driver 300, a light-emitting driver 400, a readout circuit ROC, and a voltage generator 500.

The driving controller 100 receives an input image signal RGB and a control signal CTRL. The driving controller 100 generates an output image signal DATA by converting a data format of the input image signal RGB so as to be suitable for the display panel DP and the data-driving circuit 200. The driving controller 100 outputs a scan control signal SCS, a data control signal DCS, and an emission control signal ECS.

The data-driving circuit 200 receives the data control signal DCS and the output image signal DATA from the driving controller 100. The data-driving circuit 200 converts the output image signal DATA into data signals, and then outputs the data signals to a plurality of data lines DL1 to DLm to be described later. The data signals refer to analog voltages corresponding to a grayscale level of the output image signal DATA.

The voltage generator 500 generates voltages suitable to operate the display panel DP. In one or more embodiments, the voltage generator 500 generates a first driving voltage ELVDD, a second driving voltage ELVSS, a first initialization voltage VINT1, a second initialization voltage VINT2, a reset voltage VRST, a sensor-driving voltage VCOM, and a bias voltage VBIAS.

The display panel DP includes scan lines GIL1 to GILn, GCL1 to GCLn, and GWL1 to GWLn, and GBL1 to GBLn, a reset lines RSL, emission lines EML1 to EMLn, data lines DL1 to DLm, readout lines RL1 to RLk, pixels PX, and sensors FX.

The display panel DP may include a display area DA corresponding to the transmission area TA (see FIG. 1) and a non-display area NDA corresponding to the bezel area BZA (shown in FIG. 1). The pixels PX and sensors FX may be located in the display area DA.

The scan-and-sensor driver 300 and the light-emitting driver 400 may be positioned in the non-display area NDA of the display panel DP.

In one or more embodiments, the scan-and-sensor driver 300 is located adjacent to a first side of the display area DA in the display panel DP. The scan-and-sensor driver 300 receives the scan control signal SCS from the driving controller 100. The scan-and-sensor driver 300 may output scan signals as the scan lines GIL1 to GILn, GCL1 to GCLn, and GWL1 to GWLn, and GBL1 to GBLn in response to the scan control signal SCS, and may output a reset signal to the reset line RSL. The scan lines GIL1 to GILn, GCL1 to GCLn, and GWL1 to GWLn, and GBL1 to GBLn and the reset line RSL extend from the scan-and-sensor driver 300 in the first direction DR1.

The light-emitting driver 400 is located adjacent to a second side of the display area DA in the display panel DP. The light-emitting driver 400 receives the emission control signal ECS from the controller 100. The light-emitting driver 400 may output emission signals to the emission lines EML1 to EMLn in response to the emission control signal ECS. The emission lines EML1 to EMLn extend from the light-emitting driver 400 in a direction opposite to the first direction DR1.

The scan lines GIL1 to GILn, GCL1 to GCLn, GWL1 to GWLn, and GBL1 to GBLn, the reset lines RSL, and the emission lines EML1 to EMLn are arranged spaced from one another in the second direction DR2. The data lines DL1 to DLm extend from the data-driving circuit 200 in a direction that is opposite to the second direction DR2, and are arranged spaced from one another in the first direction DR1.

The plurality of pixels PX are electrically connected to the scan lines GIL1 to GILn, GCL1 to GCLn, GWL1 to GWLn, and GBL1 to GBLn, the emission lines EML1 to EMLn, and the data lines DL1 to DLm. In one or more embodiments, each of the plurality of pixels PX may be electrically connected to four scan lines and one emission line. For example, as shown in FIG. 3, a first row of pixels may be connected to the scan lines GIL1, GCL1, GWL1, and GBL1 and the emission line EML1. Moreover, a second row of pixels may be connected to the scan lines GIL2, GCL2, GWL2, and GBL2 and the emission line EML2.

Each of the plurality of pixels PX includes a light-emitting element ED (see FIG. 5) and a pixel circuit PXC (see FIG. 5) for controlling the emission of the light-emitting element ED. The pixel circuit PXC may include one or more transistors and one or more capacitors. The scan-and-sensor driver 300 and the light-emitting driver 400 may include transistors formed through the same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 500.

Figure 5:
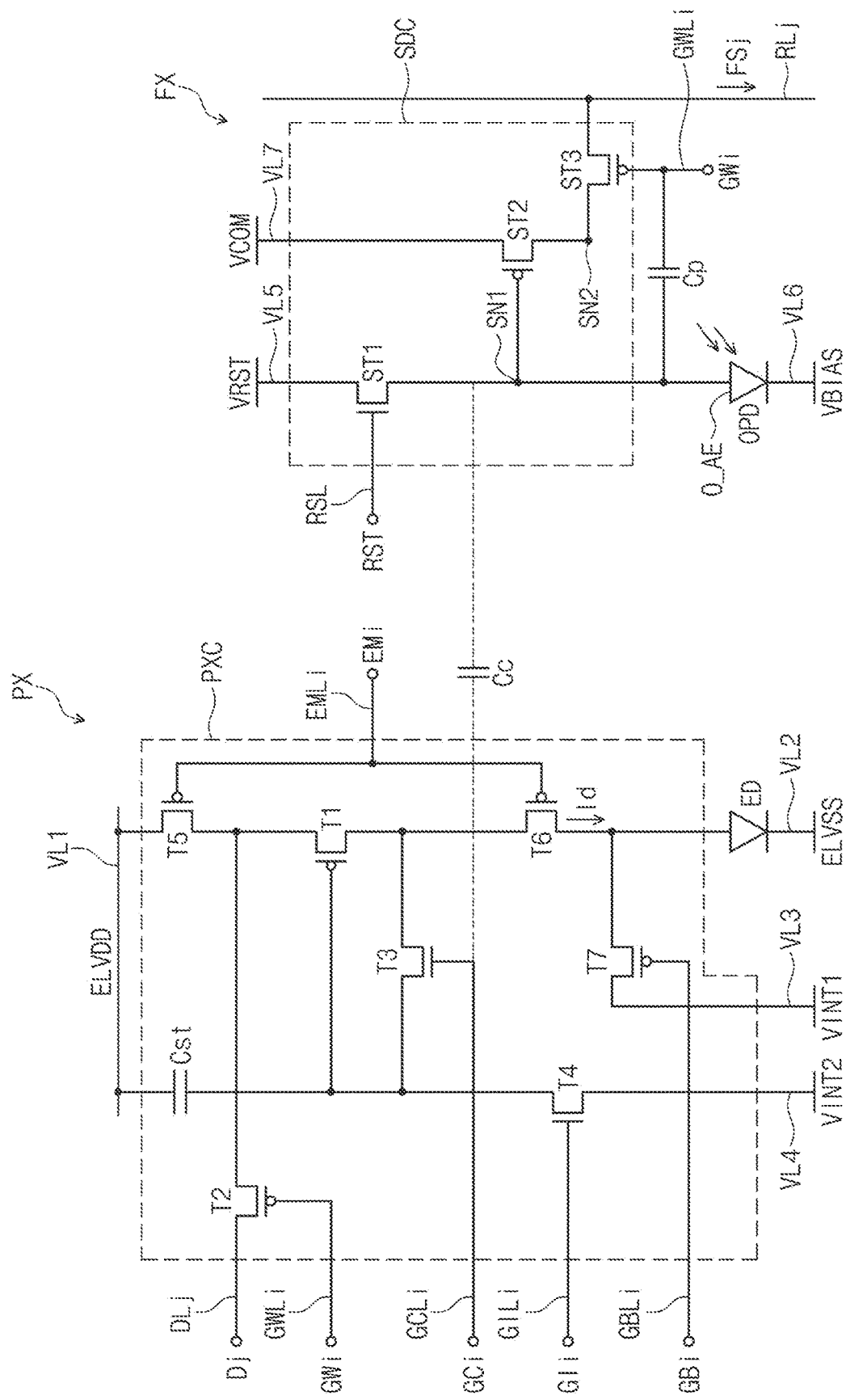
FIG. 5 is a circuit diagram of a pixel and a sensor, according to one or more embodiments of the present disclosure.

Each of the sensors FX includes a light-sensing element OPD (see FIG. 5) and a sensor-driving circuit SDC (see FIG. 5). The sensor-driving circuit SDC may include transistors formed through the same process as the pixel circuit PXC.

Each of the sensors FX may be connected to one corresponding scan line among the scan lines GWL1 to GWLn and one corresponding readout line among the readout lines RL1 to RLk. The sensors FX may be connected to the reset line RSL in common. The number of sensors FX may be less than the number of pixels PX. However, the present disclosure is not limited thereto. In one or more embodiments, the number of sensors FX placed on the display panel DP may be greater than or equal to the number of pixels PX. In one or more embodiments, the number of readout lines RL1 to RLk is less than the number of data lines DL1 to DLm. That is, k<m. However, the present disclosure is not limited thereto. In one or more embodiments, the number of readout lines RL1 to RLk located on the display panel DP may be greater than or equal to the number of data lines DL1 to DLm.

The readout circuit ROC receives the readout control signal RCS. The readout circuit ROC may receive a sensing signal from the readout lines RL1 to RLk in response to the readout control signal RCS, and may output a readout signal SS.

In one or more embodiments, the sensors FX and the readout circuit ROC may operate in a biometric-sensing mode and a touch-sensing mode. In one or more embodiments, in the biometric-sensing mode, the sensors FX and the readout circuit ROC may detect information, such as a user's blood pressure and fingerprint. In one or more embodiments, in the touch-sensing mode, the sensors FX and the readout circuit ROC may detect the user's touch location.

In the example shown in FIG. 3, the scan-and-sensor driver 300 is arranged to face the light-emitting driver 400 with the pixels PX interposed therebetween, but the present disclosure is not limited thereto. For example, the scan-and-sensor driver 300 and the light-emitting driver 400 may be arranged side by side to be adjacent to one of the first side surface or the second side surface of the display area DA in the display panel DP. In one or more embodiments, the scan-and-sensor driver 300 and the light-emitting driver 400 may be integrated into one circuit.

Figure 4:
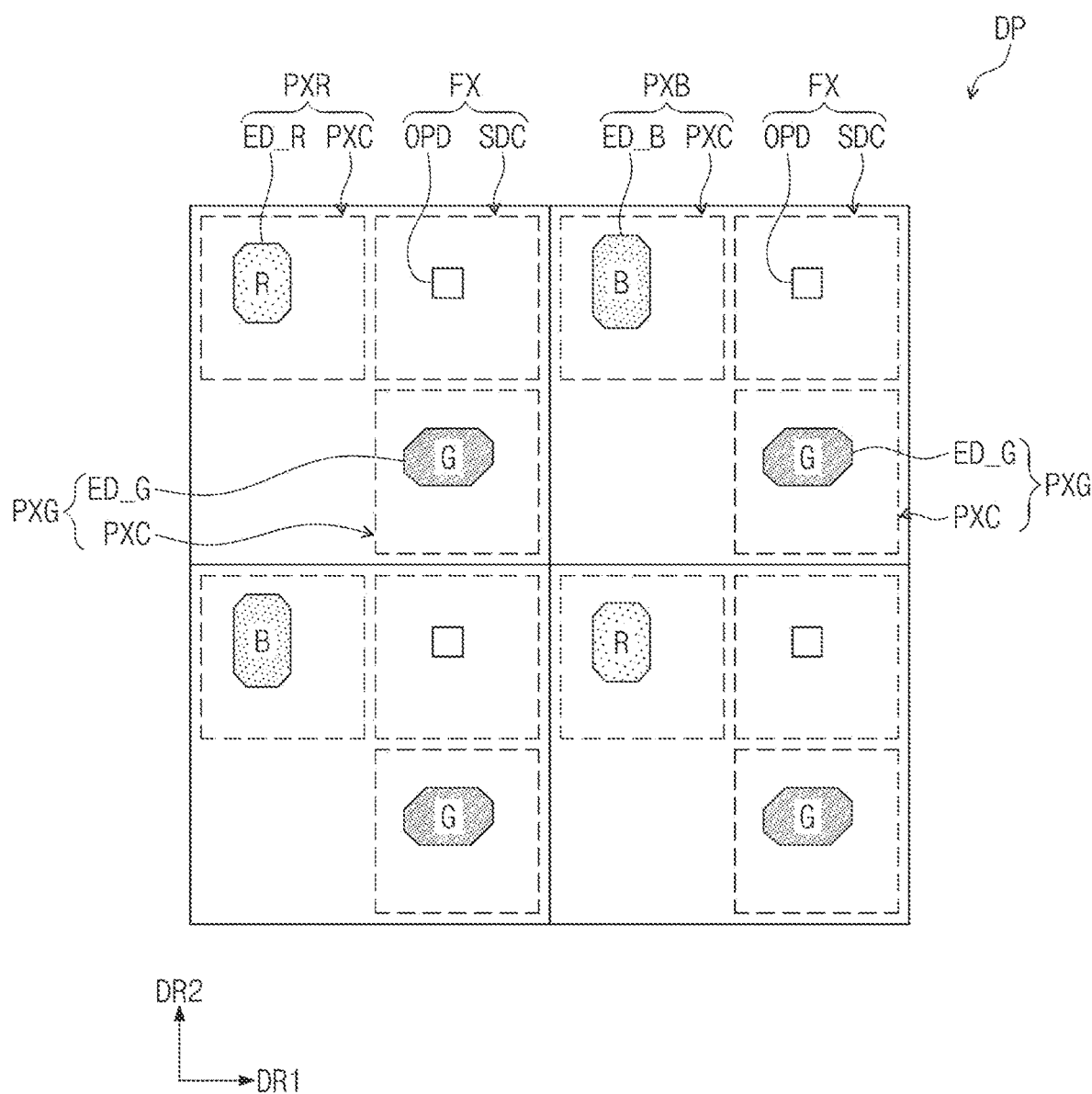
FIG. 4 is an enlarged plan view of a partial area of a display panel, according to embodiments of the present disclosure.

FIG. 4 is an enlarged plan view of a partial area of a display panel, according to embodiments of the present disclosure.

Referring to FIG. 4, pixels PXR, PXG, and PXB are arranged on the display panel DP. The pixel PXR includes a light-emitting element ED_R and the pixel circuit PXC; the pixel PXG includes a light-emitting element ED_G and the pixel circuit PXC; and, the pixel PXB includes a light-emitting element ED_B and the pixel circuit PXC. The pixels PX shown in FIG. 3 may respectively correspond to one of the pixels PXR, PXG, or PXB shown in FIG. 4. Each of the sensors FX includes the light-sensing element OPD and the sensor-driving circuit SDC.

Referring to FIG. 4, the pixels PXR and PXB and the sensors FX are located in odd-numbered rows, that is, a first row and a third row. In one or more embodiments, in the first row and third row, the pixels PXR and PXB and the sensors FX are alternately placed in the first direction DR1. Only the pixels PXG are positioned in the second row.

In one or more embodiments, the pixel PXR may include a light-emitting element ED_R that emits light of a first color (e.g., red). The pixel PXG may include a light-emitting element ED_G that emits light of a second color (e.g., green). The pixel PXB includes a light-emitting element ED_B that emits light of a third color (e.g., blue).

As shown in FIG. 4, the pixels PXR and PXB may be alternately and repeatedly positioned in the second direction DR2 as well as the first direction DR1. Each of the pixels PXG may be arranged between the two light-sensing elements OPD in the second direction DR2.

The arrangement structure of the pixels PX and the sensors FX is not limited to that of FIG. 4 and may be variously changed.

In one or more embodiments, the light-emitting element ED_R may have a larger size than the light-emitting element ED_G. Furthermore, the light-emitting element ED_B may have a size larger than or equal to the light-emitting element ED_R. The size of each of the light-emitting elements ED_R, ED_G, and ED_B is not limited thereto, and may be variously modified and applied. For example, in one or more embodiments of the present disclosure, the light-emitting elements ED_R, ED_G, and ED_B may have the same size as one another.

Besides, the shape of each of the light-emitting elements ED_R, ED_G, and ED_B may be variously transformed into a polygon, a circle, an ellipse, and the like. In one or more embodiments, the shapes of the light-emitting elements ED_R, ED_G, and ED_B may be different from one another. For example, the light-emitting element ED_G may have a circular shape, and each of the light-emitting elements ED_R and ED_B may have a quadrangle.

In one or more embodiments, an area size occupied by the sensor-driving circuit SDC may be different from an area size occupied by the pixel circuit PXC. For example, the area size of the sensor-driving circuit SDC may be smaller than that of the pixel circuit PXC.

FIG. 5 is a circuit diagram of the pixel PX and the sensor FX, according to one or more embodiments of the present disclosure.

FIG. 5 illustrates one pixel PX of the pixels PX illustrated in FIG. 3, and one sensor FX of the sensors FX illustrated in FIG. 3. Each of the plurality of pixels PX shown in FIG. 3 may have the same circuit configuration as the pixel PX shown in FIG. 5. Also, each of the sensors FX illustrated in FIG. 3 may have the same circuit configuration as the sensor FX illustrated in FIG. 5.

Referring to FIG. 5, the pixel PX includes the pixel circuit PXC and the at least one light-emitting element ED. The light-emitting element ED may be a light-emitting diode. As an example of the present disclosure, the light-emitting element ED may be an organic light-emitting diode including an organic light-emitting layer. The pixel circuit PXC according to one or more embodiments includes first to seventh transistors T1, T2, T3, T4, T5, T6, and T7 and one capacitor Cst.

The third and fourth transistors T3 and T4 of the first to seventh transistors T1 to T7 may be N-type transistors that use an oxide semiconductor as a semiconductor layer. Each of the first, second, fifth, sixth, and seventh transistors T1, T2, T5, T6, and T7 may be P-type transistors that have a low-temperature polycrystalline silicon (LTPS) semiconductor layer. However, the present disclosure is not limited thereto. In one or more embodiments, all the first to seventh transistors T1 to T7 may be P-type transistors. In one or more embodiments, all the first to seventh transistors T1 to T7 may be N-type transistors. In one or more embodiments, at least one of the first to seventh transistors T1 to T7 may be an N-type transistor and the others thereof may be P-type transistors. A configuration of the pixel circuit PXC according to the present disclosure is not limited to one or more embodiments illustrated in FIG. 5. The pixel circuit PXC illustrated in FIG. 5 is only an example. For example, the configuration of the pixel circuit PXC may be modified and implemented.

The pixel PX is electrically connected to the scan lines GILi, GCLi, GWLi, and GBLi, the emission line EMLi, and the data line DLj. The scan lines GILi, GCLi, GWLi, and GBLi may deliver scan signals Gli, GCi, GWi, and GBi, respectively. The emission line EMLi may deliver an emission signal EMi. The data line DLj delivers a data signal Dj. The data signal Dj may have a voltage level corresponding to the input image signal RGB that is input to the display device DD (see FIG. 3). First to fourth driving voltage lines VL1, VL2, VL3, and VL4 may transfer a first driving voltage ELVDD, a second driving voltage ELVSS, a first initialization voltage VINT1, and a second initialization voltage VINT2, respectively.

The first transistor T1 includes a first electrode connected with the first driving voltage line VL1 through the fifth transistor T5, a second electrode electrically connected with an anode of the light-emitting element ED through the sixth transistor T6, and a gate electrode connected with one end of the capacitor Cst. The first transistor T1 may receive the data signal Dj delivered through the data line DLj depending on the switching operation of the second transistor T2, and then may supply a driving current Id to the light-emitting element ED.

The second transistor T2 includes a first electrode connected to the data line DLj, a second electrode connected to the first electrode of the first transistor T1, and a gate electrode connected to the scan line GWLi. The second transistor T2 may be turned on in response to the scan signal GWi transferred through the scan line GWLi, and may transfer the data signal Dj transferred through the data line DLj to the first electrode of the first transistor T1.

The third transistor T3 includes a first electrode connected with the gate electrode of the first transistor T1, a second electrode connected with the second electrode of the first transistor T1, and a gate electrode connected with the scan line GCLi. The third transistor T3 may be turned on in response to the scan signal GCi transferred through the scan line GCLi, and thus, the gate electrode and the second electrode of the first transistor T1 may be connected, that is, the first transistor T1 may be diode-connected.

The fourth transistor T4 includes a first electrode connected with the gate electrode of the first transistor T1, a second electrode connected with the fourth driving voltage line VL4 through which the second initialization voltage VINT2 is transferred, and a gate electrode connected with the scan line GILi. The fourth transistor T4 may be turned on in response to the scan signal Gli transferred through the scan line GILi, such that the second initialization voltage VINT2 is transferred to the gate electrode of the first transistor T1. As such, a voltage of the gate electrode of the first transistor T1 may be initialized. This operation may be referred to as an "an initialization operation".

The fifth transistor T5 includes a first electrode connected to the first driving voltage line VL1, a second electrode connected to the first electrode of the first transistor T1, and a gate electrode connected to the emission line EMLi.

The sixth transistor T6 includes a first electrode connected to the second electrode of the first transistor T1, a second electrode connected with the anode of the light-emitting element ED, and a gate electrode connected to the emission line EMLi.

The fifth transistor T5 and the sixth transistor T6 may be concurrently or substantially simultaneously turned on in response to the emission control signal EMi transferred through the emission line EMLi. As such, the first driving voltage ELVDD may be compensated through the diode-connected transistor T1 so as to be supplied to the light-emitting element ED.

The seventh transistor T7 includes a first electrode connected to the anode of the light-emitting element ED, a second electrode connected to the third driving voltage line VL3, and a gate electrode connected to the scan line GBLi. The seventh transistor T7 is turned on in response to the scan signal GBi received through the scan line GBLi so as to electrically connect the anode of the emitting light element ED to the third driving voltage line VL3.

One end of the capacitor Cst is connected to the gate electrode of the first transistor T1, and the other end of the capacitor Cst is connected to the first driving voltage line VL1. A cathode of the light-emitting element ED may be connected with the second driving voltage line VL2 that transfers the second driving voltage ELVSS. The structure of the pixel PX according to one or more embodiments is not limited to the structure illustrated in FIG. 5. For example, the number of transistors included in the one pixel PX, the number of capacitors included in the pixel PX, and/or the connection relationship between the transistors and the capacitors may be variously modified.

The sensor FX is electrically connected to the scan line GWLi, a reset line RSL, and a readout line RLj.

The sensor FX includes the light-sensing element OPD and the sensor-driving circuit SDC. The light-sensing element OPD may be a photodiode. As an example of the present disclosure, the light-sensing element OPD may be an organic photodiode including an organic material as a photoelectric conversion layer. A light-sensing anode O_AE of the light-sensing element OPD may be connected with a first sensing node SN1, and a cathode thereof may be connected with a bias voltage line VL6 transferring the bias voltage VBIAS. In one or more embodiments, the bias voltage VBIAS may be the same voltage as the second driving voltage ELVSS provided to the cathode of the light-emitting element ED.

The sensor-driving circuit SDC includes transistors ST1, ST2, and ST3 and a compensation capacitor Cp. The transistors ST1, ST2, and ST3 may include the reset transistor ST1, the amplification transistor ST2, and the output transistor ST3. The transistors ST1, ST2, and ST3 may be referred to as the "first transistor ST1," the "second transistor ST2," and the "third transistor ST3," respectively.

Some of the reset transistor ST1, the amplification transistor ST2, and the output transistor ST3 may be P-type transistors, and the other(s) thereof may be an N-type transistor. In one or more embodiments, the reset transistor ST1 may be the same N-type transistor as the third transistor T3 of the pixel PX shown in FIG. 5, and each of the amplification transistor ST2 and the output transistor ST3 may be the same P-type transistor as the first and second transistors T1 and T2 of the pixel PX shown in FIG. 5. However, the present disclosure is not limited thereto. In one or more embodiments, all of the reset transistor ST1, the amplification transistor ST2, and the output transistor ST3 may be P-type transistors. In one or more embodiments, all of the reset transistor ST1, the amplification transistor ST2, and the output transistor ST3 may be N-type transistors.

The reset transistor ST1 includes a first electrode connected with a reset voltage line VL5 that receives a reset voltage VRST, a second electrode connected with the first sensing node SN1, and a gate electrode connected with the reset line RSL that receives the reset signal RST. The reset transistor ST1 may reset a potential of the first sensing node SN1 to the reset voltage VRST in response to the reset signal RST. In one or more embodiments, the reset voltage VRST may have a voltage level lower than the bias voltage VBIAS.

The amplification transistor ST2 includes a first electrode connected with a sensor-driving voltage line VL7 receiving the sensor-driving voltage VCOM, a second electrode connected with a second sensing node SN2, and a gate electrode connected with the first sensing node SN1. In one or more embodiments, the sensor-driving voltage VCOM may have the same voltage level as one of the first driving voltage ELVDD, the first initialization voltage VINT1, or the second initialization voltage VINT2 that are provided by the pixel PX shown in FIG. 5. The amplification transistor ST2 may provide a current corresponding to a potential of the first sensing node SN1 to the second sensing node SN2.

The output transistor ST3 includes a first electrode connected with the second sensing node SN2, a second electrode connected with a readout line RLj, and a gate electrode connected with the scan line GWLi that receives the scan signal GWi. The output transistor ST3 may output a sensing signal FSj to the readout line RLj in response to the scan signal GWi.

The compensation capacitor Cp is connected between the first sensing node SN1 and the gate electrode of the output transistor ST3. When the scan signal GWi provided to the gate electrode of the output transistor ST3 transitions to a low level, the compensation capacitor Cp may lower a voltage of the first sensing node SN1 by the voltage level of the scan signal GWi.

The circuit configuration of the sensor-driving circuit SDC according to one or more embodiments of the present disclosure is not limited to that illustrated in FIG. 5. The sensor-driving circuit SDC illustrated in FIG. 5 is only an example, and the configuration of the sensor-driving circuit SDC may be modified and implemented.

Figure 6:
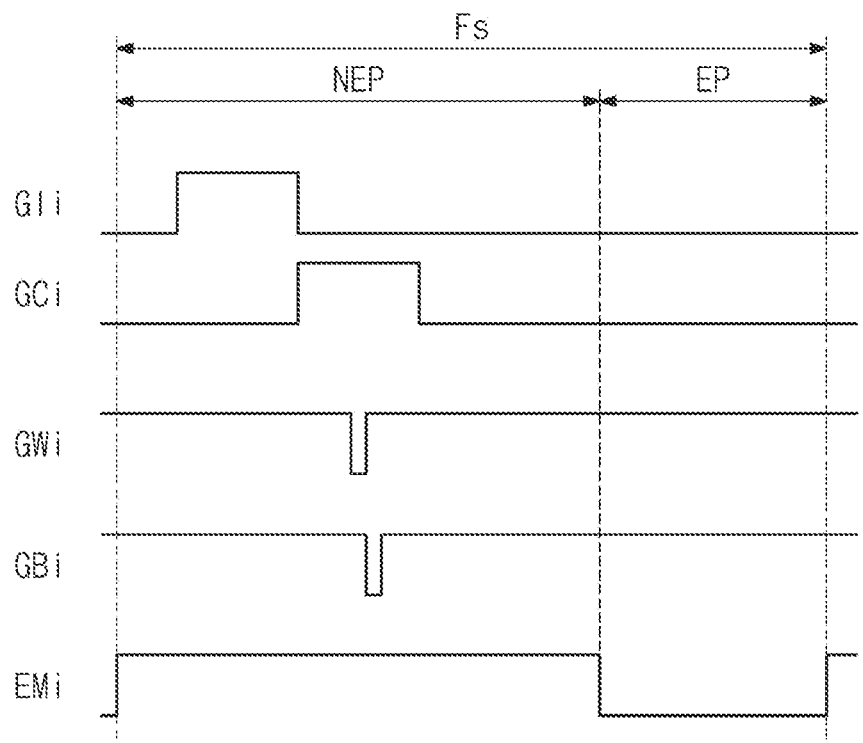
FIG. 6 is a timing diagram for describing an operation of a pixel illustrated in FIG. 5.

FIG. 6 is a timing diagram for describing an operation of a pixel illustrated in FIG. 5.

Referring to FIGS. 5 and 6, one frame Fs may include an emission period EP and a non-emission period NEP. The emission period EP may correspond to a low-level period (e.g., an active period) of the emission control signal EMi. The non-emission period NEP may correspond to a high-level period (e.g., an inactive period) of the emission control signal EMi.

The non-emission period NEP may include an initialization period and a data-programming-and-compensation period.

When the scan signal GIi having a high level is provided through the scan line GILi during the initialization period, the fourth transistor T4 is turned on. The second initialization voltage VINT2 is delivered to the gate electrode of the first transistor T1 through the fourth transistor T4 so as to initialize the first transistor T1.

Next, when the scan signal GCi having a high level is supplied through the scan line GCLi during the data-programming-and-compensation period, the third transistor T3 is turned on. The first transistor T1 is diode-connected by the third transistor T3 thus turned on to be forward-biased. At this time, when the scan signal GWi having a low level is supplied through the scan line GWLi, the second transistor T2 is turned on. In the case, a compensation voltage, which is obtained by reducing the voltage of the data signal Dj supplied from the data line DLj by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are respectively applied to opposite ends of the capacitor Cst, charges corresponding to a difference between the first driving voltage ELVDD and the compensation voltage may be stored in the capacitor Cst.

In the meantime, the seventh transistor T7 is turned on in response to the scan signal GBi having a low level that is delivered through the scan line GBLi. As the seventh transistor T7 is turned on, the anode of the light-emitting element ED is electrically connected to the third driving voltage line VL3. Accordingly, the anode of the light-emitting element ED may be initialized to the first initialization voltage VINT1.

Next, during the emission period EP, the emission control signal EMi supplied from the emission line EMLi is changed from a high level to a low level. During the emission period EP, the fifth transistor T5 and the sixth transistor T6 are turned on by the emission control signal EMi having a low level. In this case, the driving current Id according to a voltage difference between the gate voltage of the gate electrode of the first transistor T1 and the first driving voltage ELVDD is generated and supplied to the light-emitting element ED through the sixth transistor T6, and the driving current Id flows through the light-emitting element ED. The light-emitting element ED may emit light with luminance corresponding to the driving current Id.

Figure 7:
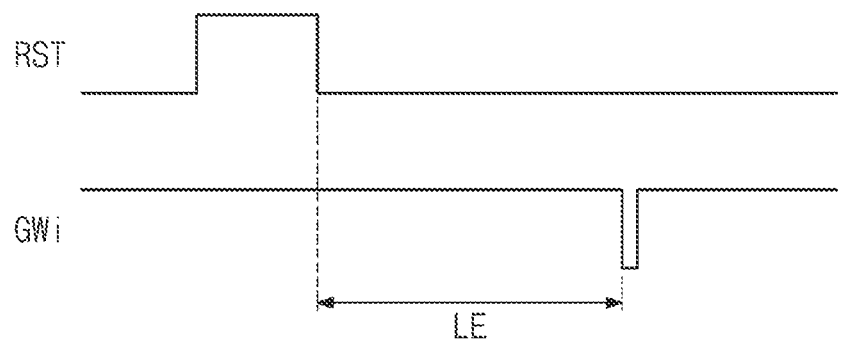
FIG. 7 is a timing diagram for describing an operation of the sensor shown in FIG. 5.

FIG. 7 is a timing diagram for describing an operation of the sensor FX shown in FIG. 5.

Referring to FIGS. 5 and 7, when the reset signal RST transitions to a high level, the reset transistor ST1 is turned on. As the reset transistor ST1 is turned on, the first sensing node SN1 may be initialized to the reset voltage VRST.

After the reset signal RST transitions to a low level, the sensor FX is exposed to light during a light exposure period LE. When a user's hand touches a display surface, the light-sensing element OPD may generate photocharges corresponding to light reflected by the user's hand, and the generated photocharges may be accumulated in the first sensing node SN1.

The amplification transistor ST2 may be a source follower amplifier that generates a source-drain current in proportion to photocharges (or a charge amount) of the first sensing node SN1 input to the gate electrode of the amplification transistor ST2.

While the scan signal GWi is at an inactive level, that is, a high level, the output transistor ST3 is turned off. When the scan signal GWi transitions to an active level, that is, a low level, the output transistor ST3 is turned on. When the output transistor ST3 is turned on, a sensing signal FSj corresponding to a current flowing through the amplification transistor ST2 may be output to the readout line RLj. That is, the sensing signal FSj corresponding to the amount of light sensed by the light-sensing element OPD may be output to the readout line RLj.

In one or more embodiments, the scan signal GWi may be the same signal as the scan signal GWi shown in FIGS. 5 and 6. That is, the pixels PX and the sensors FX arranged in the i-th row illustrated in FIG. 3 may receive the same scan signal GWi.

In one or more embodiments, during a biometric-sensing mode, the light-sensing element OPD may generate photocharges corresponding to light reflected by a ridge of a fingerprint or a valley between ridges of the fingerprint. In the biometric-sensing mode, the sensing signal FSj output from the sensor FX may be a signal corresponding to the user's fingerprint.

In one or more embodiments, in the biometric-sensing mode, the light-sensing element OPD may generate photocharges corresponding to light reflected from blood vessels located under a dermal layer of the user's skin. During cardiac systole, blood moves to the periphery, increasing arterial blood volume. On the other hand, during cardiac diastole, blood volume decreases. This change in blood volume changes the reflected light. In the biometric-sensing mode, the sensing signal FSj output from the sensor FX may be a signal corresponding to the user's blood pressure.

In one or more embodiments, in a touch-sensing mode, the light-sensing element OPD may generate photocharges corresponding to light reflected by the user's touch. In the touch-sensing mode, the sensing signal FSj output from the sensor FX may be a signal indicating whether a user performs a touch operation.

Figure 8A:
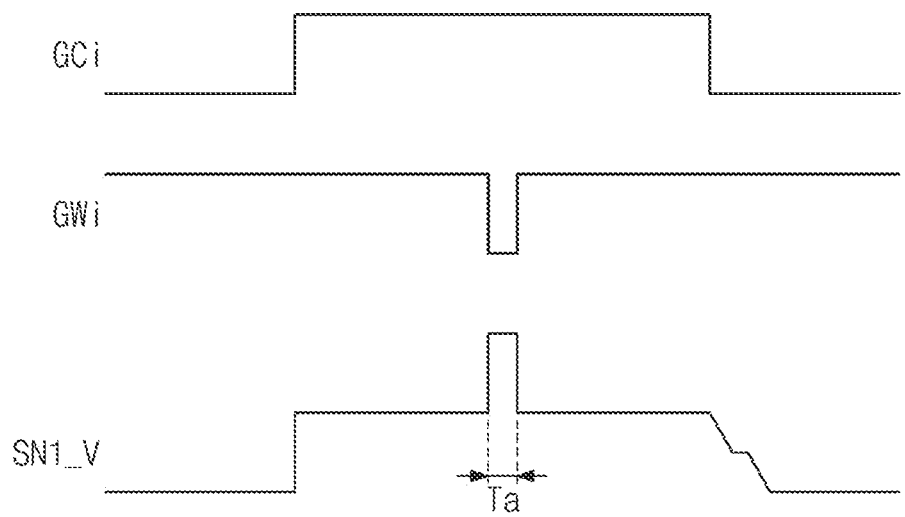
FIGS. 8A and 8B are timing diagrams for describing an operation of a sensor.
Figure 8B:
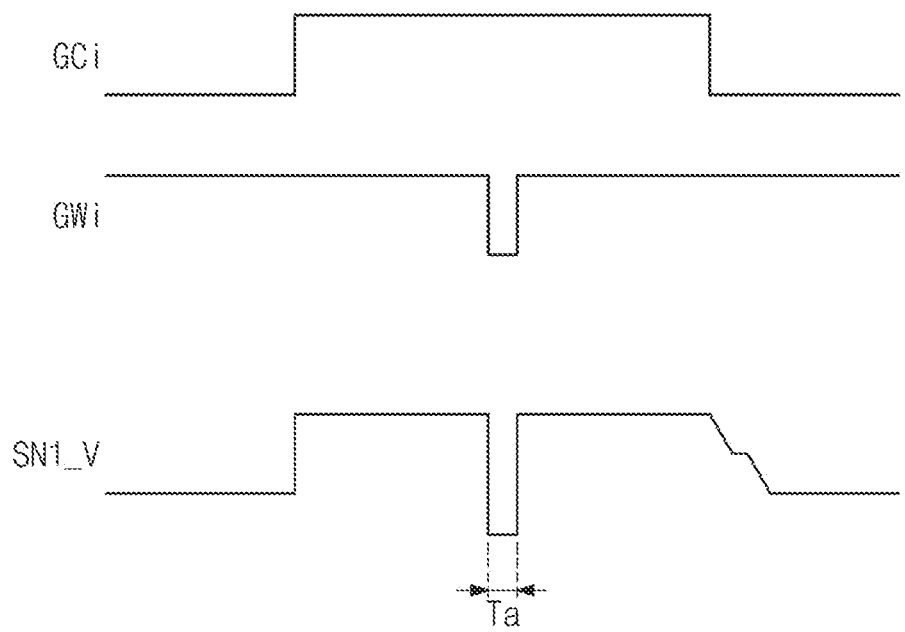

FIGS. 8A and 8B are timing diagrams for describing an operation of the sensor FX.

FIG. 8A shows a voltage level SN1_V of the first sensing node SN1 when the sensor FX does not include the compensation capacitor Cp.

Referring to FIGS. 5 and 8A, coupling capacitance Cc may be formed between the first sensing node SN1 and the scan line GCLi (also referred to as a "compensation scan line"). When the scan signal GCi transmitted through the scan line GCLi transitions to a high level, the voltage level SN1_V of the first sensing node SN1 rises as much as the voltage level of the scan signal GCi due to the coupling capacitance Cc.

In this state, when the scan signal GWi transitions to a low level, the voltage level of the second sensing node SN2 may rise depending on the voltage level of the readout line RLj. In this case, the voltage level SN1_V of the first sensing node SN1 may further rise due to the coupling capacitance between the first sensing node SN1 and the second sensing node SN2.

As a voltage difference (e.g., |Vgs|) between the gate electrode and the source electrode increases, the amplification transistor ST2 may have improved signal-to-noise ratio (SNR) characteristics. However, when the voltage of the gate electrode (e.g., the voltage level SN1_V of the first sensing node SN1) of the amplification transistor ST2 rises as shown in FIG. 8A, the voltage difference (|Vgs|) between the gate electrode and the source electrode of the amplification transistor ST2 decreases during an output period Ta. As a result, the SNR characteristics of the transistor ST2 may be lowered.

FIG. 8B shows the voltage level SN1_V of the first sensing node SN1 when the sensor FX includes the compensation capacitor Cp.

Referring to FIGS. 5 and 8B, in one or more embodiments of the present disclosure, the compensation capacitor Cp is connected between the first sensing node SN1 and the gate electrode of the output transistor ST3. When the scan signal GWi transitions to a low level, the voltage level SN1_V of the first sensing node SN1 may be lowered by an amount of change in the voltage level of the scan signal GWi due to the compensation capacitor Cp.

That is, when the sensing signal FSj corresponding to the amount of light sensed by the light-sensing element OPD is output to the readout line RLj (e.g., during the output period Ta), the voltage difference (|Vgs|) between the gate electrode and the source electrode of the amplification transistor ST2 increases. As a result, the SNR characteristics of the transistor ST2 may be improved.

Figure 9:
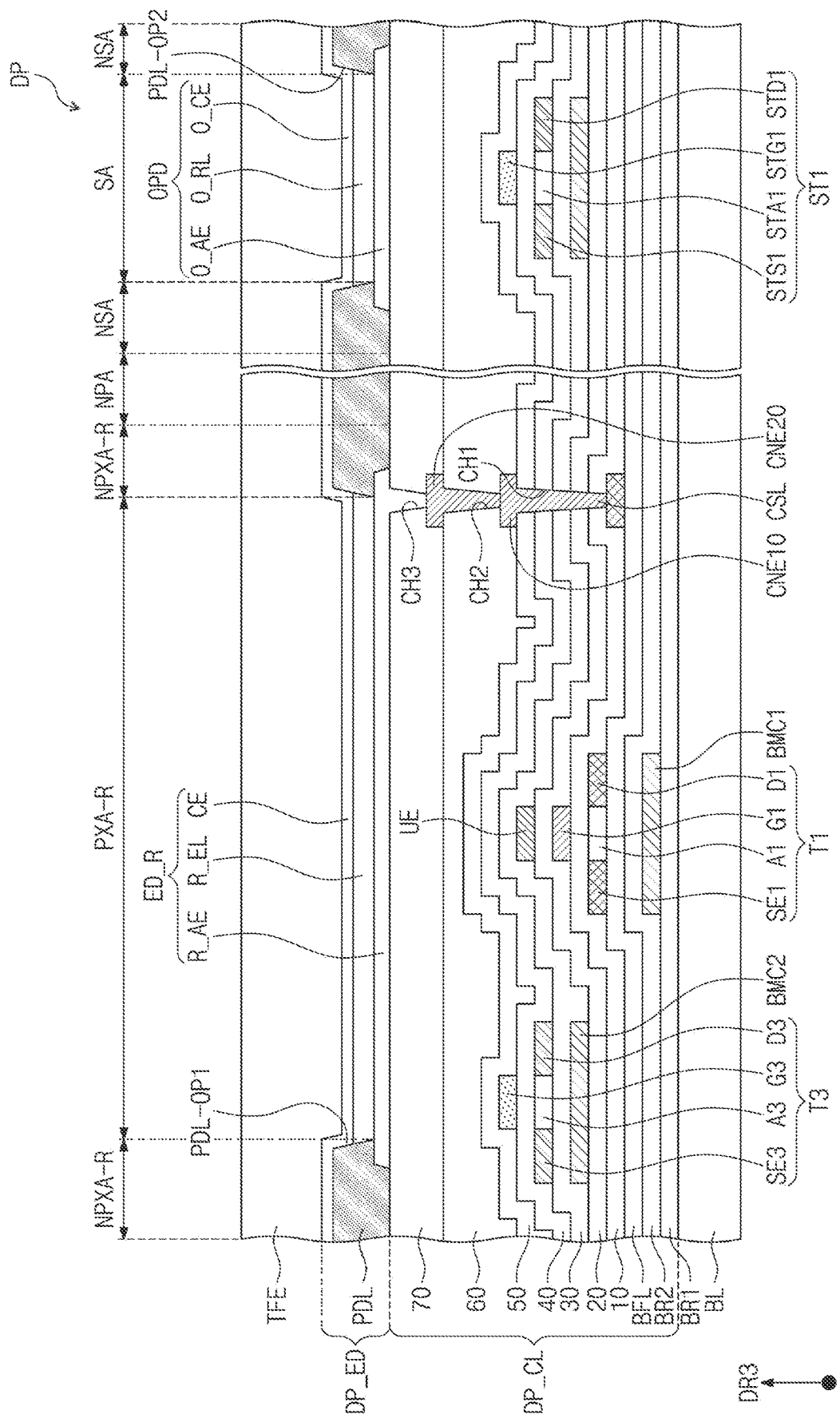
FIG. 9 is a cross-sectional view of a display panel, according to one or more embodiments of the present disclosure.

FIG. 9 is a cross-sectional view of the display panel DP, according to one or more embodiments of the present disclosure. FIG. 9 shows portions of first and third transistors T1 and T3 and the reset transistor ST1 shown in FIG. 5.

Referring to FIG. 9, the display panel DP may include the base layer BL, the circuit layer DP_CL located on the base layer BL, the element layer DP_ED, and the encapsulation layer TFE.

The base layer BL may include a synthetic resin layer. The synthetic resin layer may include a thermosetting resin. In detail, the synthetic resin layer may be a polyimide-based resin layer, and the material thereof is not particularly limited thereto. The synthetic resin layer may include at least one of acrylate-based resin, methacrylate-based resin, polyisoprene, vinyl-based resin, epoxy-based resin, urethane-based resin, cellulose-based resin, siloxane-based resin, polyamide-based resin, or perylene-based resin. Besides, the base layer may include a glass substrate, a metal substrate, an organic/inorganic composite substrate, or the like.

At least one inorganic layer is formed on an upper surface of the base layer BL. The inorganic layer may include at least one of aluminum oxide, titanium oxide, silicon oxide, silicon oxynitride, zirconium oxide, or hafnium oxide. The inorganic layer may be formed of multiple layers. The multi-layered inorganic layers may constitute barrier layers BR1 and BR2 and/or a buffer layer BFL, which will be described later. The barrier layers BR1 and BR2 and the buffer layer BFL may be located selectively.

The barrier layers BR1 and BR2 reduce or prevent foreign objects from being introduced from the outside. The barrier layers BR1 and BR2 may include a silicon oxide layer and a silicon nitride layer. Each of the silicon oxide layer and the silicon nitride layer may include a plurality of layers, and the silicon oxide layers and the silicon nitride layers may be alternately stacked.

The barrier layers BR1 and BR2 may include the first barrier layer BR1 and the second barrier layer BR2. A first back metal layer BMC1 may be interposed between the first barrier layer BR1 and the second barrier layer BR2. In one or more embodiments of the present disclosure, the first back metal layer BMC1 may be omitted.

The buffer layer BFL may be located on the barrier layers BR1 and BR2. The buffer layer BFL improves a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A first semiconductor pattern may be located on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 9 illustrates only a portion of the first semiconductor pattern located on the buffer layer BFL. Another portion of the first semiconductor pattern may be further located in another area. The first semiconductor pattern may be arranged across pixels. The first semiconductor pattern may have electrical characteristics that are different depending on whether the first semiconductor pattern is doped. The first semiconductor pattern may include a first area having high conductivity, and a second area having low conductivity. The first area may be doped with an N-type dopant or a P-type dopant. A P-type transistor may include an area doped with the P-type dopant, and an N-type transistor may include an area doped with the N-type dopant. The second area may be an undoped area, or may be an area that is doped with a concentration that is lower than a concentration in the first area.

The conductivity of the first area is greater than the conductivity of the second area. The first area may substantially serve as an electrode or as a signal line. The second area may substantially correspond to an active area (or a channel) of a transistor. In other words, a part of the semiconductor pattern may be an active area of the transistor. Another part thereof may be a source or drain of the transistor. Another part thereof may be a connection electrode or a connection signal line.

A first electrode SE1, a channel part A1, and a second electrode D1 of the first transistor T1 are formed from the first semiconductor pattern. The first electrode SE1 and the second electrode D1 of the first transistor T1 extend in opposite directions from the channel part A1.

A portion of a connection signal line CSL formed from the first semiconductor pattern is illustrated in FIG. 9. In one or more embodiments, the connection signal line CSL may be electrically connected to the second electrode of the sixth transistor T6 (see FIG. 5) on a plane.

A first insulating layer 10 may be located on the buffer layer BFL. The first insulating layer 10 may overlap a plurality of pixels in common, and may cover the first semiconductor pattern. The first insulating layer 10 may be an inorganic layer and/or an organic layer, and may have a single layer or multi-layer structure. The first insulating layer 10 may include at least one of aluminum oxide, titanium oxide, silicon oxide, silicon nitride, silicon oxynitride, zirconium oxide, or hafnium oxide. In one or more embodiments, the first insulating layer 10 may be a single silicon oxide layer. An insulating layer of the circuit layer DP_CL, which is to be described later, as well as the first insulating layer 10 may be an inorganic layer and/or an organic layer, and may have a single layer structure or a multi-layer structure. The inorganic layer may include at least one of the above-described materials, but is not limited thereto.

A gate electrode G1 of the first transistor T1 is located on the first insulating layer 10. The gate electrode G1 may be a portion of a metal pattern. The gate electrode G1 of the first transistor T1 overlaps the channel part A1 of the first transistor T1. In a process of doping the first semiconductor pattern, the gate electrode G1 of the first transistor T1 may function as a mask. The gate electrode G1 may include, but is not limited to, titanium (Ti), silver (Ag), an alloy containing silver (Ag), molybdenum (Mo), an alloy containing molybdenum (Mo), aluminum (Al), an alloy containing aluminum (Al), an aluminum nitride (AlN), tungsten (W), a tungsten nitride (WN), copper (Cu), indium tin oxide (ITO), indium zinc oxide (IZO), or the like.

A second insulating layer 20 may be located on the first insulating layer 10, and may cover the gate electrode G1 of the first transistor T1. The second insulating layer 20 may be an inorganic layer and/or an organic layer, and may have a single layer structure or a multi-layer structure. The second insulating layer 20 may include at least one of silicon oxide, silicon nitride, or silicon oxynitride. In one or more embodiments, the second insulating layer 20 may have a multi-layer structure including a silicon oxide layer and a silicon nitride layer.

An upper electrode UE and a second back metal layer BMC2 may be located on the second insulating layer 20. The upper electrode UE may overlap the gate electrode G1. The upper electrode UE may be a portion of a metal pattern. A portion of the gate electrode G1, and the upper electrode UE overlapping the portion of the third electrode G1, may define the capacitor Cst (see FIG. 5). In one or more embodiments of the present disclosure, the second insulating layer 20 may be replaced with an insulating pattern. In this case, the upper electrode UE may be located on an insulating pattern, and the upper electrode UE may serve as a mask for forming an insulating pattern from the second insulating layer 20.

The second back metal layer BMC2 may be located to correspond to a lower portion of an oxide thin film transistor (e.g., the third transistor T3). The second back metal layer BMC2 may receive a constant voltage or a signal.

A third insulating layer 30 may be located on the second insulating layer 20 and may cover the upper electrode UE and the second back metal layer BMC2. The third insulating layer 30 may have a single layer or multi-layer structure. For example, the third insulating layer 30 may have a multi-layer structure including a silicon oxide layer and a silicon nitride layer.

A second semiconductor pattern may be located on the third insulating layer 30. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area substantially serves as a source/drain area of a transistor or a signal line. The non-reduction area substantially corresponds to an active area (alternatively, a semiconductor area or a channel) of the transistor. In other words, a part of the second semiconductor pattern may be the active area of the transistor, and another part thereof may be the source/drain area of the transistor and may be a signal transmission area.

A first electrode SE3, a channel part A3, and a second electrode D3 of the third transistor T3 are formed from the second semiconductor pattern. The first electrode SE3 and the second electrode D3 include a metal reduced from a metal oxide semiconductor. The first electrode SE3 and the second electrode D3 may extend in directions opposite to each other from the channel part A3 on a cross section.

A fourth insulating layer 40 may be located on the third insulating layer 30. The fourth insulating layer 40 may overlap a plurality of pixels in common and may cover the second semiconductor pattern. The fourth insulating layer 40 may include at least one of aluminum oxide, titanium oxide, silicon oxide, silicon nitride, silicon oxynitride, zirconium oxide, or hafnium oxide.

A gate electrode G3 of the third transistor T3 is located on the fourth insulating layer 40. The gate electrode G3 may be a portion of a metal pattern. The gate electrode G3 of the third transistor T3 overlaps the channel part A3 of the third transistor T3. The gate electrode G3 may function as a mask in a process of doping the second semiconductor pattern. In one or more embodiments of the present disclosure, the fourth insulating layer 40 may be replaced with an insulating pattern.

The fifth insulating layer 50 may be located on the fourth insulating layer 40, and may cover the gate electrode G3. The fifth insulating layer 50 may be an inorganic layer.

A first connection electrode CNE10 may be located on the fifth insulating layer 50. The first connection electrode CNE10 may be connected to the connection signal line CSL through a first contact hole CH1 penetrating the first to fifth insulating layers 10, 20, 30, 40, and 50.

The sixth insulating layer 60 may be located on the fifth insulating layer 50. The sixth insulating layer 60 may be an organic layer. The organic layer may include general purpose polymers, such as benzocyclobutene (BCB), polyimide, hexamethyldisiloxane (HMDSO), polymethylmethacrylate (PMMA) or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and/or the blend thereof, but is not particularly limited thereto.

A second connection electrode CNE20 may be located on the fifth insulating layer 60. The second connection electrode CNE20 may be connected to the first connection electrode CNE10 through a second contact hole CH2 penetrating the sixth insulating layer 60. The seventh insulating layer 70 may be located on the sixth insulating layer 60, and may cover the second connection electrode CNE20. The seventh insulating layer 70 may be an organic layer.

A first electrode layer is located on the circuit layer DP_CL. A pixel-defining layer PDL is formed on the first electrode layer. The first electrode layer may include a first anode R_AE and the light-sensing anode O_AE. In one or more embodiments, the first anode R_AE and the light-sensing anode O_AE are located on the seventh insulating layer 70. The first anode R_AE may be connected to the second connection electrode CNE20 through a third contact hole CH3 penetrating the seventh insulating layer 70. FIG. 9 shows only the first anode R_AE corresponding to red light. However, the first electrode layer may further include a second anode corresponding to green light and a third anode corresponding to blue light.

First and second film openings PDL-OP1 and PDL-OP2 are provided on the pixel-defining layer PDL. The first film opening PDL-OP1 exposes at least part of the first anode R_AE. The second film opening PDL-OP2 exposes at least part of the light-sensing anode O_AE.

In one or more embodiments of the present disclosure, the pixel-defining layer PDL may further include a black material. The pixel-defining layer PDL may further include a black organic dye/pigment, such as carbon black, aniline black, or the like. The pixel-defining layer PDL may be formed by mixing a blue organic material and a black organic material. The pixel-defining layer PDL may further include a liquid-repellent organic material.

As shown in FIG. 9, the display panel DP may include an emission area PXA-R and a non-emission area NPXA-R adjacent to the emission area PXA-R. The non-emission area NPXA-R may surround the emission area PXA-R. In one or more embodiments, the emission area PXA-R is defined to correspond to a partial area of the first anode R_AE exposed by the first film opening PDL-OP1.

A light-emitting layer may be located on the first electrode layer. The light-emitting layer may include red, green, and blue light-emitting layers. The red, green, and blue light-emitting layers may be located in areas corresponding to the first film openings PDL-OP1. The red, green, and blue light-emitting layers may be separately formed in red, green, and blue pixels PXR, PXG, and PXB illustrated in FIG. 4, respectively. Each of the red, green, and blue light-emitting layers may include an organic material and/or an inorganic material. The red, green, and blue light-emitting layers may generate a colored light (e.g., a predetermined colored light). For example, the light-emitting layer R_EL may generate red light. FIG. 9 shows that the light-emitting layer R_EL is located in an area corresponding to the first film opening PDL-OP1.

In one or more embodiments, patterned red, green, and blue light-emitting layers are described. However, one light-emitting layer may be commonly located in a plurality of emission areas. At this time, the light-emitting layer may generate white light or blue light. Also, the light-emitting layer may have a multi-layer structure referred to as "tandem".

The light-emitting layer R_EL may include a low-molecular organic material or a high-molecular organic material as a light-emitting material. A cathode CE is located on the light-emitting layer R_EL. As an example of the present disclosure, the cathode CE may be commonly located in the emission area PXA-R, the non-emission area NPXA-R, and a non-pixel area NPA.

The circuit layer DP_CL may further include the sensor-driving circuit SDC (see FIG. 7). For convenience of description, the reset transistor ST1 of the sensor-driving circuit SDC is shown. A first electrode STS1, a channel part STA1, and a second electrode STD1 of the reset transistor ST1 are formed from the second semiconductor pattern. The first electrode STS1 and the second electrode STD1 include a metal reduced from a metal oxide semiconductor. The fourth insulating layer 40 is located to cover the first electrode STS1, the channel part STA1, and the second electrode STD1 of the reset transistor ST1. A gate electrode STG1 of the reset transistor ST1 is located on the fourth insulating layer 40. In one or more embodiments, the gate electrode STG1 may be a part of the metal pattern. The gate electrode STG1 of the reset transistor ST1 overlaps the channel part STA1 of the reset transistor ST1.

In one or more embodiments of the present disclosure, the reset transistor ST1 may be located on the same layer as the third transistor T3. That is, the first electrode STS1, the channel part STA1, and the second electrode STD1 of the reset transistor ST1 may be formed through a process the same as the first electrode SE3, the channel part A3, and the second electrode D3 of the third transistor T3. The gate electrode STG1 of the reset transistor ST1 may be concurrently or substantially simultaneously formed through the same process as the gate electrode G3 of the third transistor T3. In one or more embodiments, the first electrode and the second electrode of each of the amplification transistor ST2 and the output transistor ST3 of the sensor-driving circuit SDC may be formed through the same process as the first electrode SE1 and the second electrode D1 of the first transistor T1. The reset transistor ST1 and the third transistor T3 may be formed on the same layer through the same process. Accordingly, because an additional process of forming the reset transistor ST1 is not required, process efficiency and costs may be reduced.

The element layer DP_ED may further include the light-sensing element OPD (see FIG. 5). FIG. 9 shows only the light-sensing element OPD.

The light-sensing element OPD may include the light-sensing anode O_AE, a photoelectric conversion layer O_RL, and a photoelectric cathode O_CE. The light-sensing anode O_AE may be located on the same layer as the first electrode layer. That is, the light-sensing anode O_AE may be located on the circuit layer DP_CL, and may be concurrently or substantially simultaneously formed through the same process as the first anode R_AE.

The second film opening PDL-OP2 of the pixel-defining layer PDL exposes at least part of the light-sensing anode O_AE. The photoelectric conversion layer O_RL is located on the light-sensing anode O_AE exposed by the second film opening PDL-OP2. The photoelectric conversion layer O_RL may include an organic photo-sensing material. The photoelectric cathode O_CE may be located on the photoelectric conversion layer O_RL. The photoelectric cathode O_CE may be concurrently or substantially simultaneously formed through the same process as the cathode CE. As an example of the present disclosure, the photoelectric cathode O_CE may be integrated with the cathode CE.

Each of the light-sensing anode O_AE and the photoelectric cathode O_CE may receive an electrical signal. The photoelectric cathode O_CE may receive a signal that is different from that of the light-sensing anode O_AE. Accordingly, an electric field (e.g., a predetermined electric field) may be formed between the light-sensing anode O_AE and the photoelectric cathode O_CE. The photoelectric conversion layer O_RL generates an electrical signal corresponding to the light incident on a sensor. The photoelectric conversion layer O_RL may generate charges by absorbing the energy of the incident light. For example, the photoelectric conversion layer O_RL may include a light-sensitive semiconductor material.

The charges generated by the photoelectric conversion layer O_RL change an electric field between the light-sensing anode O_AE and the photoelectric cathode O_CE. The amount of charge generated by the photoelectric conversion layer O_RL may vary depending on whether light is incident onto the light-sensing element OPD, the amount of light incident onto the light-sensing element OPD, and the intensity of light incident onto the light-sensing element OPD. Accordingly, the electric field formed between the light-sensing anode O_AE and the photoelectric cathode O_CE may be changed. The light-sensing element OPD according to one or more embodiments of the present disclosure may obtain one of the fingerprint, blood pressure, or touch information of a user through a change in the electric field between the light-sensing anode O_AE and the photoelectric cathode O_CE.

However, this is illustrated by way of example. The light-sensing element OPD may include a phototransistor that uses the photoelectric conversion layer O_RL as an active layer. In this case, the light-sensing element OPD may obtain fingerprint information by sensing the amount of current flowing through the phototransistor. The light-sensing element OPD according to one or more embodiments of the present disclosure may include various photoelectric conversion elements capable of generating electrical signals in response to a change in the amount of light, but the present disclosure is not limited to one or more embodiments.

The encapsulation layer TFE is located on the element layer DP_ED. The encapsulation layer TFE includes at least one inorganic layer or at least one organic layer. In one or more embodiments of the present disclosure, the encapsulation layer TFE may include two inorganic layers and an organic layer located therebetween. In one or more embodiments of the present disclosure, a thin film encapsulation layer may include a plurality of inorganic layers and a plurality of organic layers, which are alternately stacked.

The encapsulation inorganic layer protects the light-emitting element ED_R and the light-sensing element OPD from moisture/oxygen, and the encapsulation organic layer protects the light-emitting element ED_R and the light-sensing element OPD from foreign substances. The encapsulation inorganic layer may include a silicon nitride layer, a silicon oxynitride layer, a silicon oxide layer, a titanium oxide layer, an aluminum oxide layer, or the like, but is not specifically limited thereto. The encapsulation organic layer may include an acryl-based organic layer, and is not specifically limited thereto.

Figure 10:
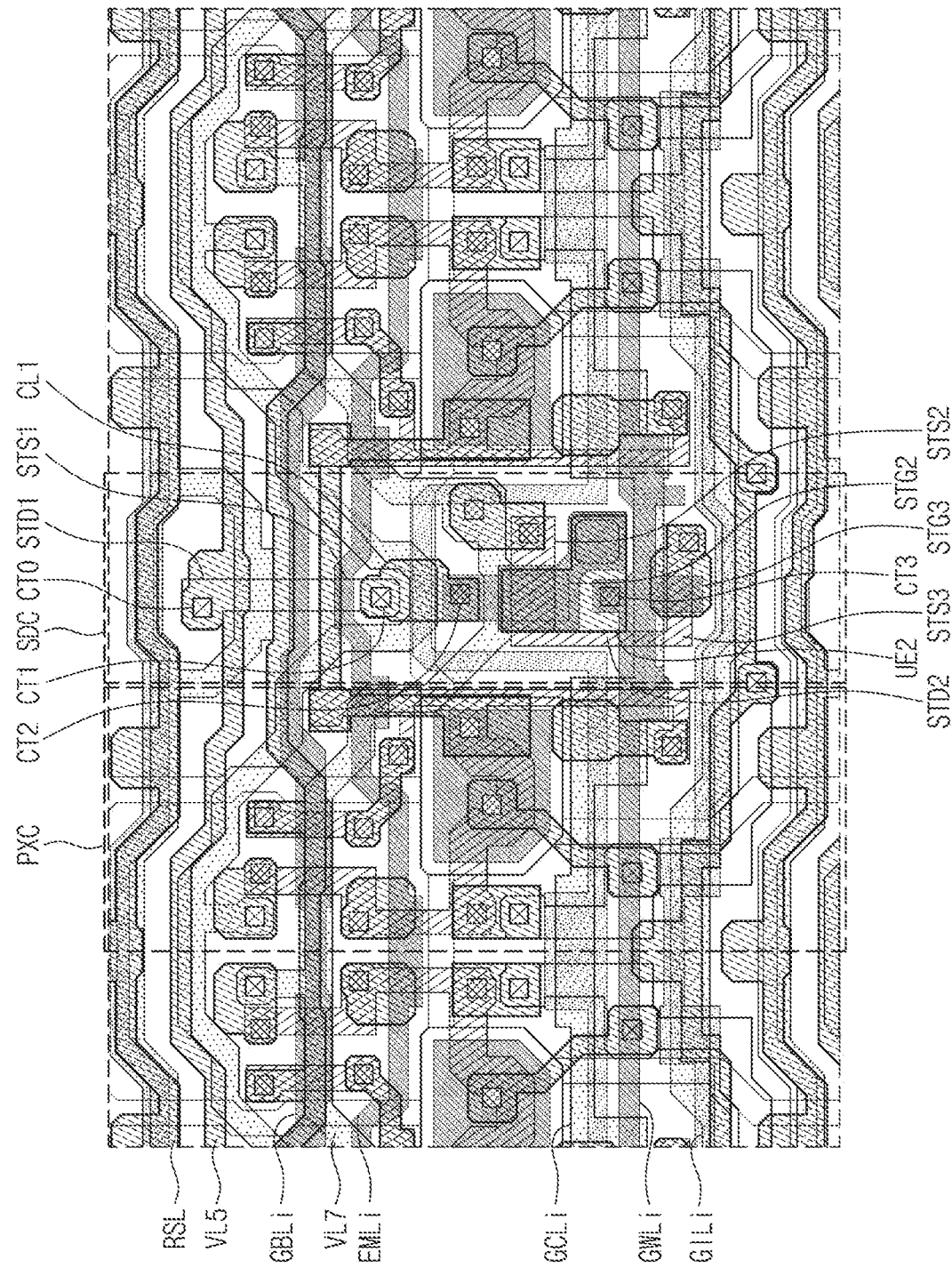
FIG. 10 is a plan view of a display panel, according to one or more embodiments of the present disclosure.

FIG. 10 is a plan view of the display panel DP, according to one or more embodiments of the present disclosure. FIG. 10 shows the pixel circuit PXC of the pixel PX and the sensor-driving circuit SDC of the sensor FX.

Figure 11:
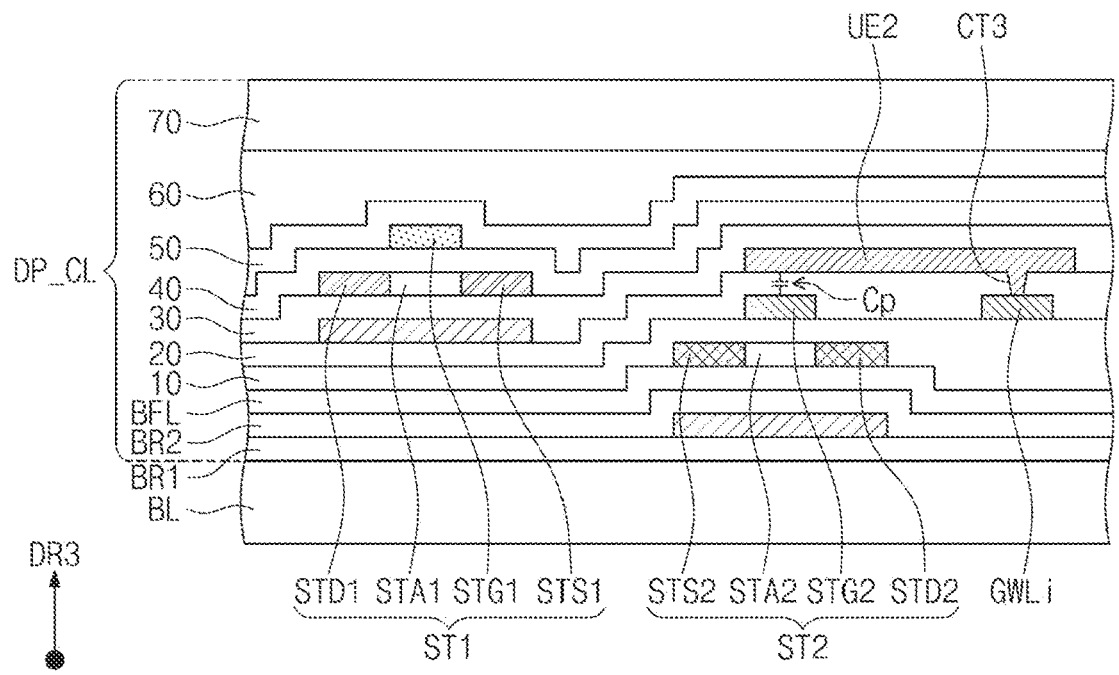
FIG. 11 is a cross-sectional view of a display panel, according to one or more embodiments of the present disclosure.

FIG. 11 is a cross-sectional view of the display panel DP, according to one or more embodiments of the present disclosure. FIG. 11 shows a part of the reset transistor ST1 and the amplification transistor ST2 shown in FIG. 5.

Referring to FIGS. 5 and 10, the second electrode STD1 of the reset transistor ST1 is connected to the reset voltage line VL5 through a contact hole CT0. The first electrode STS1 of the reset transistor ST1 is connected to a connection line CL1 through a contact hole CT1. The connection line CL1 is connected to a gate electrode STG2 of the amplification transistor ST2 through a contact hole CT2. That is, the second electrode STD1 of the reset transistor ST1 may be connected to the gate electrode STG2 of the amplification transistor ST2 through the connection line CL1.

A first electrode STS2 of the amplification transistor ST2 is connected to a sensor-driving voltage line VL7. A second electrode STD2 of the amplification transistor ST2 is connected to a first electrode STS3 of the output transistor ST3.

A gate electrode STG3 of the output transistor ST3 is connected to the scan line GWLi.

An upper electrode UE2 is electrically connected to the scan line GWLi through a contact hole CT3. In one or more embodiments, the scan line GWLi may be formed of the same material on the same layer as the gate electrode STG2 of the amplification transistor ST2.

A part of the upper electrode UE2 overlaps the gate electrode STG2 of the amplification transistor ST2, and another part thereof overlaps the scan line GWLi.

The gate electrode STG2 of the amplification transistor ST2 may be the first electrode of the compensation capacitor Cp. The upper electrode UE2 may be the second electrode of the compensation capacitor Cp. That is, the compensation capacitor Cp is connected between the gate electrode STG2 of the amplification transistor ST2 and the scan line GWLi.

Figure 12:
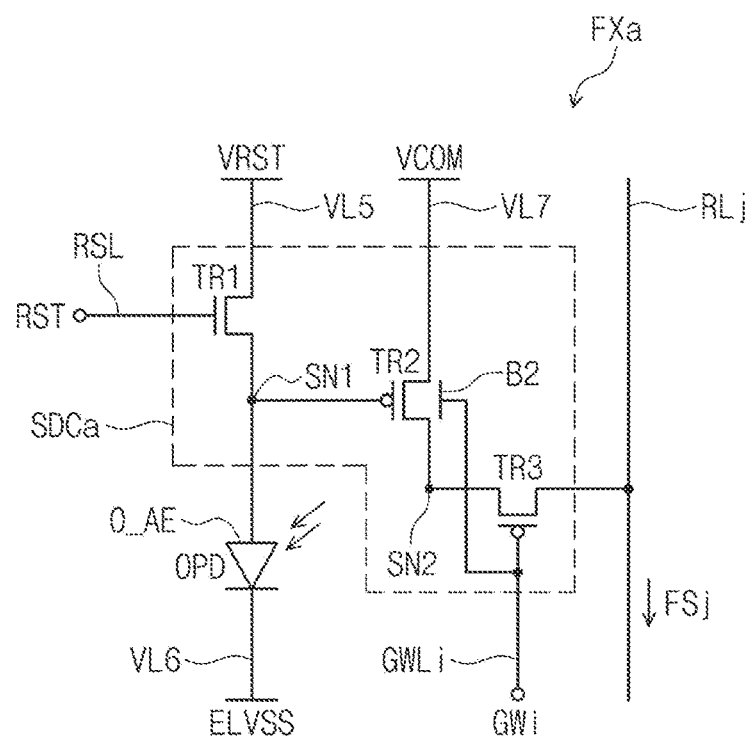
FIG. 12 is a circuit diagram of a sensor, according to one or more embodiments of the present disclosure.

FIG. 12 is a circuit diagram of a sensor FXa, according to one or more embodiments of the present disclosure.

Referring to FIG. 12, the sensor FXa is electrically connected to the scan line GWLi, the reset line RSL, and the readout line RLj.

The sensor FXa includes the light-sensing element OPD and a sensor-driving circuit SDCa. The light-sensing element OPD may be a photodiode. As an example of the present disclosure, the light-sensing element OPD may be an organic photodiode including an organic material as a photoelectric conversion layer. The light-sensing anode O_AE of the light-sensing element OPD may be connected to the first sensing node SN1, and a cathode thereof may be connected with the bias voltage line VL6 transferring the bias voltage VBIAS. In one or more embodiments, the bias voltage VBIAS may be the same voltage as the second driving voltage ELVSS provided to the cathode of the light-emitting element ED.

The sensor-driving circuit SDCa includes three transistors TR1, TR2, and TR3. The three transistors TR1, TR2, and TR3 may include the reset transistor TR1, the amplification transistor TR2, and the output transistor TR3. The transistors TR1, TR2, and TR3 may be referred to as the "first transistor TR1," the "second transistor TR2," and the "third transistor TR3," respectively.

Some of the reset transistor TR1, the amplification transistor TR2, and the output transistor TR3 may be P-type transistors, and the other(s) thereof may be an N-type transistor. In one or more embodiments, the reset transistor TR1 may be the same N-type transistor as the third transistor T3 of the pixel PX shown in FIG. 5, and each of the amplification transistor TR2 and the output transistor TR3 may be the same P-type transistor as the first and second transistors T1 and T2 of the pixel PX shown in FIG. 5. However, the present disclosure is not limited thereto. In one or more embodiments, all of the reset transistor TR1, the amplification transistor TR2, and the output transistor TR3 may be P-type transistors. In one or more embodiments, all of the reset transistor TR1, the amplification transistor TR2, and the output transistor TR3 may be N-type transistors.

The reset transistor TR1 includes a first electrode connected with the reset voltage line VL5 that receives the reset voltage VRST, a second electrode connected with the first sensing node SN1, and a gate electrode connected with the reset line RSL that receives the reset signal RST. The reset transistor TR1 may reset a potential of the first sensing node SN1 to the reset voltage VRST in response to the reset signal RST. In one or more embodiments, the reset voltage VRST may have a voltage level lower than the bias voltage VBIAS.

The amplification transistor TR2 includes a first electrode connected with the sensor-driving voltage line VL7 receiving the sensor-driving voltage VCOM, a second electrode connected with the second sensing node SN2, and a gate electrode connected with the first sensing node SN1. In one or more embodiments, the sensor-driving voltage VCOM may have the same voltage level as one of the first driving voltage ELVDD, the first initialization voltage VINT1, or the second initialization voltage VINT2 that are provided by the pixel PX shown in FIG. 5. The amplification transistor TR2 may provide a current corresponding to a potential of the first sensing node SN1 to the second sensing node SN2.

The output transistor TR3 includes a first electrode connected with the second sensing node SN2, a second electrode connected with the readout line RLj, and a gate electrode connected with the scan line GWLi receiving the scan signal GWi. The output transistor TR3 may output the sensing signal FSj to the readout line RLj in response to the scan signal GWi.

In one or more embodiments, the amplification transistor TR2 may further include a body electrode B2 (or a lower gate electrode). The body electrode B2 of the amplification transistor TR2 may be connected to the scan line GWLi.

Figure 13:
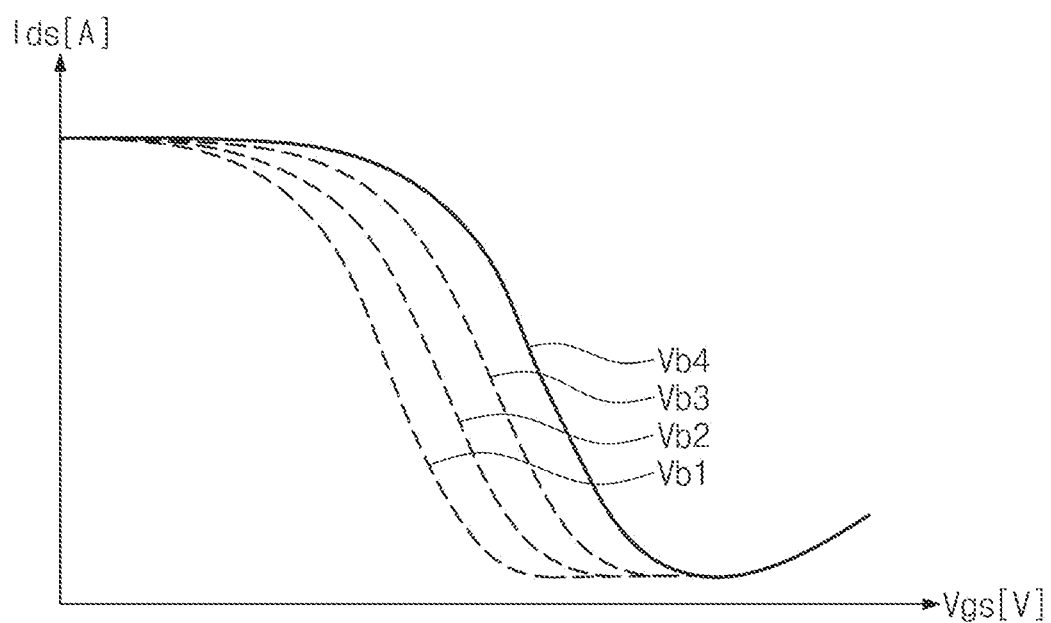
FIG. 13 is a diagram showing voltage-current characteristics of an amplification transistor shown in FIG. 12.

FIG. 13 is a diagram showing voltage-current characteristics of the amplification transistor TR2 shown in FIG. 12.

Referring to FIGS. 12 and 13, a threshold voltage (referred to as "Vth") of the amplification transistor TR2 including the body electrode B2 may be changed depending on a body-source voltage of the amplification transistor TR2. For example, when the body-source voltage of the first transistor T1 decreases, the threshold voltage Vth of the amplification transistor TR2 increases, thereby increasing a current (referred to as "Ids") flowing through the amplification transistor TR2.

In the example shown in FIG. 13, as a voltage Vb1, Vb2, Vb3, or Vb4 of the body electrode B2 of the amplification transistor TR2 is lowered (e.g., when Vb1>Vb2>Vb3>Vb4), a threshold voltage Vth of the amplification transistor TR2 rises. That is, as the voltage of the body electrode B2 of the amplification transistor TR2 decreases when a gate-source voltage (referred to as "Vgs") of the amplification transistor TR2 is the same, a current Ids flowing through the amplification transistor TR2 may increase, thereby reducing or minimizing the SNR of the amplification transistor TR2.

Although one or more embodiments of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

A display device having such a configuration may lower a voltage level of a sensing node at a point in time when a current corresponding to the intensity of light detected by a light-sensing element is output, thereby reducing or preventing the deterioration of signal-to-noise ratio (SNR) characteristics due to coupling capacitance between the sensing node in a sensor and peripheral elements.

Accordingly, the performance of biometric information recognition and touch recognition of the display device may be improved.

While the present disclosure has been described with reference to embodiments thereof, it will be apparent to those of ordinary skill in the art that various changes and modifications may be made thereto without departing from the spirit and scope of the present disclosure as set forth in the following claims, with functional equivalents thereof to be included therein.

What is claimed is:

1. A sensor of a display comprising:
a light-sensing element connected between a bias voltage line, which is configured to provide a bias voltage, and a first sensing node;
a first transistor connected between a reset voltage line, which is configured to provide a reset voltage that has a level that is lower than a level of the bias voltage, and the first sensing node;
a second transistor connected between a sensor-driving voltage line, which is configured to provide a sensor-driving voltage that is different from the reset voltage, and a second sensing node, and comprising a gate electrode connected to the first sensing node;
a third transistor connected between the second sensing node and a readout line, and comprising a gate electrode connected to a scan line of the display; and
a compensation capacitor connected between the gate electrode of the second transistor and the scan line.

2. The sensor of claim 1, further comprising an upper electrode above the gate electrode of the second transistor, and electrically connected to the scan line through a contact hole,
wherein the compensation capacitor comprises the gate electrode of the second transistor and the upper electrode.

3. The sensor of claim 2, wherein a part of the upper electrode overlaps the gate electrode of the second transistor, and another part of the upper electrode overlaps the scan line.

4. The sensor of claim 2, wherein the scan line comprises a same material as, and is at a same layer as, the gate electrode of the second transistor.

5. The sensor of claim 1, wherein the first transistor comprises a first type, and
wherein the second transistor and the third transistor comprise a second type that is different from the first type.

6. A display device comprising:
a pixel comprising a light-emitting element;
a sensor comprising a light-sensing element connected to a bias voltage line, which is configured to provide a bias voltage, and a sensor-driving circuit connected to the light-sensing element through a first sensing node; and
a readout circuit configured to receive a sensing signal from the sensor,
wherein the sensor-driving circuit of the sensor comprises:
a first transistor connected between a reset voltage line, which is configured to provide a reset voltage that has a level that is lower than a level of the bias voltage, and the first sensing node;
a second transistor connected between a sensor-driving voltage line, which is configured to provide a sensor-driving voltage that is different from the reset voltage, and a second sensing node, and comprising a gate electrode connected to the first sensing node;
a third transistor connected between the second sensing node and a readout line, and comprising a gate electrode connected to a scan line; and
a compensation capacitor connected between the gate electrode of the second transistor and the scan line.

7. The display device of claim 6, further comprising an upper electrode above the gate electrode of the second transistor, and electrically connected to the scan line through a contact hole,
wherein the compensation capacitor comprises the gate electrode of the second transistor and the upper electrode.

8. The display device of claim 7, wherein a part of the upper electrode overlaps the gate electrode of the second transistor, and another part of the upper electrode overlaps the scan line.

9. The display device of claim 7, wherein the scan line comprises a same material as, and is at a same layer as, the gate electrode of the second transistor.

10. The display device of claim 6, wherein the first transistor comprises a first type, and
wherein the second transistor and the third transistor comprise a second type that is different from the first type.

11. The display device of claim 10, further comprising:
a first pixel transistor comprising a first electrode, a second electrode connected to the light-emitting element, and a gate electrode;
a second pixel transistor connected between a data line and the first electrode of the first pixel transistor, and comprising a gate electrode connected to the scan line; and
a third pixel transistor connected between the second electrode of the first pixel transistor and the gate electrode of the first pixel transistor, and comprising a gate electrode connected to a compensation scan line.

12. The display device of claim 11, wherein the first pixel transistor and the second pixel transistor comprise the second type, and
wherein the third pixel transistor comprises the first type.

13. The display device of claim 6, further comprising a scan-and- sensor driver configured to provide a scan signal to the scan line.

14. A display device comprising:
a base layer;
a circuit layer above the base layer; and
an element layer above the circuit layer, and comprising a light-emitting element and a light-sensing element,
wherein the light-sensing element is connected to a bias voltage line, which is configured to provide a bias voltage, wherein the circuit layer comprises:
  a first transistor connected to the light-sensing element through a first sensing node, and configured to receive a reset voltage that has a level that is lower than a level of the bias voltage;
  a second transistor connected between a sensor-driving voltage line, which is configured to provide a sensor-driving voltage that is different from the reset voltage, and a second sensing node, and comprising a gate electrode connected to the first sensing node;
  a third transistor connected between the second sensing node and a readout line, and comprising a gate electrode connected to a scan line; and
  an upper electrode above the gate electrode of the second transistor and electrically connected to the scan line through a contact hole, and
  wherein a compensation capacitor comprises the gate electrode of the second transistor and the upper electrode, and
  wherein the scan line comprises a same material as, and is at a same layer as, the gate electrode of the second transistor.

15. The display device of claim 14, wherein a part of the upper electrode overlaps the gate electrode, and another part of the upper electrode overlaps the scan line.

16. The display device of claim 14, wherein the first transistor comprises a first type, and
  wherein the second transistor and the third transistor comprise a second type that is different from the first type.

17. The display device of claim 14, wherein the circuit layer further comprises:
  a first pixel transistor comprising a first electrode, a second electrode connected to the light-emitting element, and a gate electrode;
  a second pixel transistor connected between a data line and the first electrode of the first pixel transistor, and comprising a gate electrode connected to the scan line; and
  a third pixel transistor connected between the second electrode of the first pixel transistor and the gate electrode of the first pixel transistor, and comprising a gate electrode connected to a compensation scan line.

18. A sensor of a display comprising:
  a light-sensing element connected to a first sensing node;
  a first transistor connected between a reset voltage line, which is configured to provide a reset voltage, and the first sensing node;
  a second transistor connected between a sensor-driving voltage line, which is configured to provide a sensor-driving voltage that is different from the reset voltage, and a second sensing node, and comprising a gate electrode connected to the first sensing node, and a body electrode electrically connected to a scan line of the display; and
  a third transistor connected between the second sensing node and a readout line, and comprising a gate electrode connected to the scan line,
  wherein the scan line comprises a same material as, and is at a same layer as, the gate electrode of the second transistor.

19. The sensor of claim 18, wherein the first transistor comprises a first type, and
  wherein the second transistor and the third transistor comprise a second type that is different from the first type.

20. An electronic device comprising:
  a pixel comprising a light-emitting element;
  a sensor comprising a light-sensing element connected to a bias voltage line, which is configured to provide a bias voltage, and a sensor-driving circuit connected to the light-sensing element through a first sensing node; and
  a readout circuit configured to receive a sensing signal from the sensor,
  wherein the sensor-driving circuit of the sensor comprises:
    a first transistor connected between a reset voltage line, which is configured to provide a reset voltage that has a level that is lower than a level of the bias voltage, and the first sensing node;
    a second transistor connected between a sensor-driving voltage line, which is configured to provide a sensor-driving voltage that is different from the reset voltage, and a second sensing node, and comprising a gate electrode connected to the first sensing node;
    a third transistor connected between the second sensing node and a readout line, and comprising a gate electrode connected to a scan line; and
    a compensation capacitor connected between the gate electrode of the second transistor and the scan line.

* * * * *